(12) United States Patent
Yu et al.

(10) Patent No.: US 8,315,556 B2
(45) Date of Patent: Nov. 20, 2012

(54) APPARATUS AND METHOD FOR BIDIRECTIONAL RELAYING IN A RELAY WIRELESS COMMUNICATION SYSTEM

(75) Inventors: Tak-Ki Yu, Yongin-si (KR); Eun-Seok Ko, Seongnam-si (KR); Yu-Seok Kim, Seoul (KR); Joo-Hwan Chun, Daejeon (KR); Hyun-Jong Yang, Daejeon (KR)

(73) Assignees: Samsung Electronics Co., Ltd., Suwon-si (KR); Korea Advance Institute of Science and Technology, Daejeon (KR)

( * ) Notice: Subject to any disclaimer, the term of this patent is extended or adjusted under 35 U.S.C. 154(b) by 292 days.

(21) Appl. No.: 12/661,916

(22) Filed: Mar. 26, 2010

(65) Prior Publication Data
US 2010/0248729 A1   Sep. 30, 2010

(30) Foreign Application Priority Data
Mar. 27, 2009   (KR) .................. 10-2009-0026266

(51) Int. Cl.
*H04B 7/185*   (2006.01)

(52) U.S. Cl. ...... 455/13.1; 455/11.1; 370/274; 370/279; 370/315; 370/492; 370/501

(58) Field of Classification Search .............. 455/3.02, 455/427, 428, 430, 431, 7–9, 11.1, 12.1, 455/13.1, 13.2, 14–17; 340/425.1; 370/226, 370/293, 246, 274, 279, 315, 316, 492, 501
See application file for complete search history.

(56) References Cited

U.S. PATENT DOCUMENTS

| | | | |
|---|---|---|---|
| 7,720,020 B2 * | 5/2010 | Larsson | 370/315 |
| 2001/0030948 A1 * | 10/2001 | Tiedemann, Jr. | 370/305 |
| 2009/0129496 A1 * | 5/2009 | Zhang et al. | 375/262 |
| 2009/0185521 A1 * | 7/2009 | Li et al. | 370/315 |
| 2009/0268657 A1 * | 10/2009 | Alexiou et al. | 370/315 |

* cited by examiner

*Primary Examiner* — Dominic E Rego

(57) ABSTRACT

An apparatus for use in a relay wireless communication system is capable of bidirectional relaying with precoding. A Base Station (BS) includes a plurality of antennas. The BS can receive a relay signal that includes a transmit symbol vector of the BS and a transmit symbol vector of a Mobile Station (MS) from a Relay Station. The BS determines power difference values corresponding to all of symbol vectors available as the transmit symbol vector of the MS. The BS further determines the transmit symbol vector of the MS or per bit Log Likelihood Ratios using the power difference values.

18 Claims, 16 Drawing Sheets

APPARATUS AND METHOD FOR BIDIRECTIONAL RELAYING IN A RELAY WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Mar. 27, 2009 and assigned Serial No. 10-2009-0026266, the entire disclosure of which is hereby incorporated by reference.

TECHNICAL FIELD OF THE INVENTION

The present invention relates generally to a relay wireless communication system. More particularly, the present invention relates to an apparatus and a method for bidirectional relaying with precoding applied in the relay wireless communication system.

BACKGROUND OF THE INVENTION

A fourth Generation (4G) communication system, which is a next-generation communication system, is advancing to provide users with services of various Quality of Service (QoS) levels at a data rate of about 100 Mbps. In particular, researches are conducted on the 4 G communication system to support a high speed service by ensuring mobility and QoS in a Broadband Wireless Access (BWA) communication system such as wireless local area network system and wireless metropolitan area network system. As a solution for ensuring mobility of a terminal and flexibility of a wireless network configuration and for providing more efficient services in a wireless environment under severe change of traffic distribution or traffic requirement, the next-generation communication system is considering a communication system which adopts a multihop relay transmission using a relay station. By employing the relay station in the wireless communication system, coverage increase of a base station and throughput enhancement can be attained.

Two-hop communications between a Base Station (BS) and a Mobile Station (MS) via a Relay Station (RS) are shown in FIG. 1A. In FIG. 1A, the BS 110 and the MS 120 each intend to transmit data, and the RS 130 relays the transmit data of the BS 110 and the transmit data of the MS 120. More particularly, the BS 110 transmits 101 data $D_1$ to the RS 130 and the RS 130 transmits 103 the data $D_1$ to the MS 120. The MS 120 transmits 105 data $D_2$ to the RS 130 and the RS 130 transmits 107 the data $D_2$ to the BS 110. In the two-hop relay communication of FIG. 1A, the transmission and reception of four phases in total is required to deliver the data of the transmitter and the receiver. That is, four-time transmission time intervals are required to deliver the data of the transmitter and the receiver. To reduce the time taken for the relay communications; that is, to reduce the number of the transmissions and to thus raise the resource utilization, a three-phase bidirectional relaying method is suggested. The three-phase bidirectional relaying method is also called a Network Coding (NC) method.

Two-hop communications based on the three-phase bidirectional method are shown in FIG. 1B. In FIG. 1B, the BS 160 and the MS 170 each want to transmit data, and the RS 180 relays the transmit data of the BS 160 and the transmit data of the MS 170. More specifically, the BS 160 transmits 161 data $D_1$ to the RS 180 and the MS 170 transmits 163 data $D_2$ to the RS 180. The RS 180 applies exclusive OR (XOR) operation to the data $D_1$ and the data $D_2$ and transmits 165 data $D_1 \oplus D_2$. The BS 160 and the MS 170 receiving the data $D_1 \oplus D_2$ recover the transmit data of the sender by applying the XOR operation to their transmit data and the data $D_1 \oplus D_2$. By applying the three-phase bidirectional relay to the two-hop relay communication as shown in FIG. 1B, the data transmissions of the transmitter and the receiver are accomplished merely with the three-phase transmission and reception.

When the three-phase bidirectional relaying method is applied as discussed above, the capacity of the system is limited by the capacity of the poorer channel of the channel between the RS and the BS and the channel between the RS and the MS. In other words, even when the channel quality between the RS and the BS is quite good, the poor channel quality between the RS and the MS decreases the total capacity of the system. In this situation, most of the channel capacity between the RS and the BS becomes the redundant resource. In this regard, what is needed is a solution for enhancing the performance of the relay wireless communication system by efficiently utilizing the redundant resource.

SUMMARY OF THE INVENTION

To address the above-discussed deficiencies of the prior art, it is a primary aspect of the present invention to provide an apparatus and a method for enhancing performance of a system by efficiently using redundant resources caused by asymmetric channel quality between hops in a relay wireless communication system.

Another aspect of the present invention is to provide an apparatus and a method for enhancing performance of a three-phase bidirectional relaying scheme in a relay wireless communication system.

Yet another aspect of the present invention is to provide an apparatus and a method for three-phase bidirectional relay by applying precoding in a relay wireless communication system.

According to one aspect of the present invention, an operating method of a Base Station (BS) including a plurality of antennas in a relay wireless communication system includes receiving a relay signal comprising a transmit symbol vector of the BS and a transmit symbol vector of a Mobile Station (MS) from a Relay Station (RS); determining power difference values corresponding to all of symbol vectors available as the transmit symbol vector of the MS; and determining the transmit symbol vector of the MS or per bit Log Likelihood Ratios (LLRs) using the power difference values. The power difference value indicates a difference value between a transmit signal power of the BS extracted from a received signal using an estimation value of the transmit symbol vector of the MS, and a transmit signal power of the BS.

According to another aspect of the present invention, an operating method of a RS including a plurality of antennas in a relay wireless communication system includes determining a precoding matrix for a relay signal; determining relay power coefficients for a BS and an MS respectively; generating the relay signal by summing a product of a transmit symbol vector of the MS, the precoding matrix, and the relay power coefficient of the MS and a product of a transmit symbol vector of the BS and the relay power coefficient of the BS; and transmitting the relay signal to the BS and the MS at the same time.

According to yet another aspect of the present invention, an operating method of an MS in a relay wireless communication system includes receiving a relay signal that includes a transmit symbol vector of a BS and a transmit symbol vector of the MS from an RS; determining a coupling matrix using a channel matrix between the RS and the MS; diagonalizing an effective channel using the coupling matrix; and detecting the transmit symbol vector of the BS by removing the effective channel component.

According to still another aspect of the present invention, an apparatus of a BS including a plurality of antennas in a relay wireless communication system includes receivers that receive a relay signal comprising a transmit symbol vector of the BS and a transmit symbol vector of an MS from an RS; and a detector that determines power difference values corresponding to all of symbol vectors available as the transmit symbol vector of the MS, and determines the transmit symbol vector of the MS or per bit LLRs using the power difference values. The power difference value indicates a difference value between a transmit signal power of the BS extracted from a received signal using an estimation value of the transmit symbol vector of the MS, and a transmit signal power of the BS.

According to a further aspect of the present invention, an apparatus of a RS including a plurality of antennas in a relay wireless communication system includes a calculator that determines a precoding matrix for a relay signal; a processor that determines relay power coefficients for a BS and an MS respectively, and generates the relay signal by summing a product of a transmit symbol vector of the MS, the precoding matrix, and the relay power coefficient of the MS and a product of a transmit symbol vector of the BS and the relay power coefficient of the BS; and transmitters that transmits the relay signal to the BS and the MS at the same time.

According to a further aspect of the present invention, an apparatus of an MS in a relay wireless communication system includes receivers that receive a relay signal that includes a transmit symbol vector of a BS and a transmit symbol vector of the MS from an RS; and a detector that determines a coupling matrix using a channel matrix between the RS and the MS, diagonalizes an effective channel using the coupling matrix, and detects the transmit symbol vector of the BS by removing the effective channel component.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 15C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technique for three-phase bidirectional relaying with precoding applied in a relay wireless communication system. Hereinafter, Orthogonal Frequency Division Multiplexing (OFDM)/Orthogonal Frequency Division Multiple Access (OFDMA) wireless communication system is exemplified. The present invention is applicable to other wireless communication systems.

It is assumed that channel quality between hops is asymmetric. That is, it is assumed that the channel quality between a Relay Station (RS) and a Base Station (BS) is better than the channel quality between the RS and a Mobile Station (MS). Also, it is assumed that the BS, the MS and the RS each include N-ary transmit antennas and N-ary receive antennas and that the number of transmit streams of the BS and the MS is N.

Figure 1A:
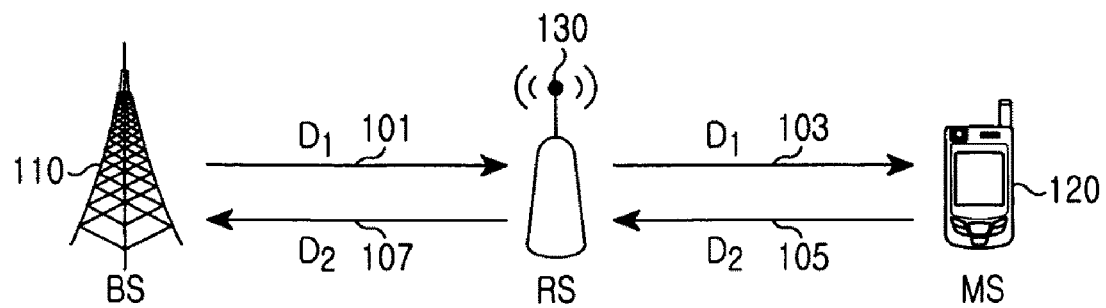
FIG. 1A illustrates communications in a conventional relay wireless communication system.
Figure 1B:
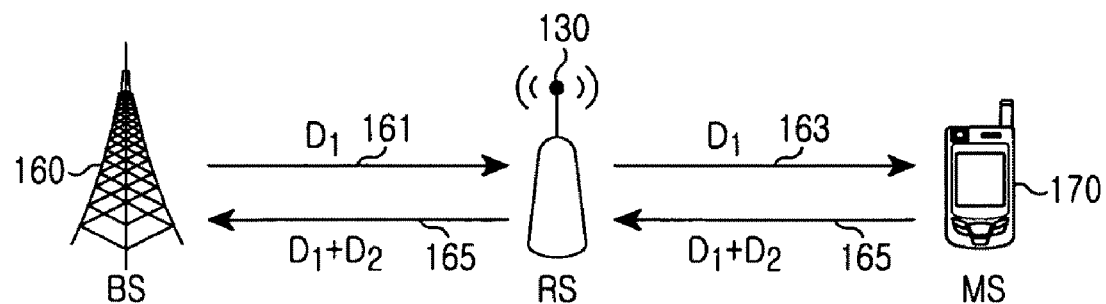
FIG. 1B illustrates relay communications applying a three-phase bidirectional relaying scheme in the conventional relay wireless communication system.
Figure 2:
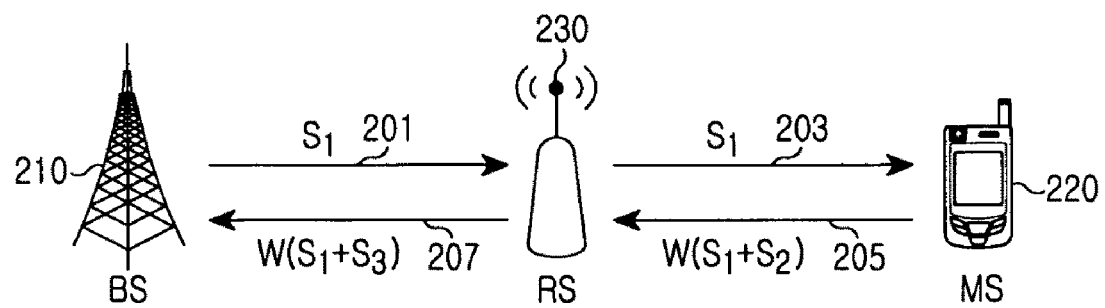
FIG. 2 illustrates relay communications in a relay wireless communication system according to one exemplary embodiment of the present invention.

Two-hop relay communications according to one exemplary embodiment of the present invention are shown in FIG. 2.

In FIG. 2, the BS 210 transmits a symbol vector $S_1$ to the RS 230 in step 201 and the MS 220 transmits a symbol vector $S_2$ to the RS 230 in step 203. The RS 230 applies an XOR operation to the symbol vector $S_1$ and the symbol vector $S_2$ and then multiplies a linear precoding matrix W by the symbol vector $S_3(=S_1 \oplus S_2)$. Next, the RS 230 transmits $W \cdot S_3$ to the BS 210 and the MS 220 at the same time in step 205. Herein, the linear precoding matrix W is given by Equation 1:

$$W = V_2 \qquad [\text{Eqn. 1}]$$

In Equation 1, W denotes the linear precoding matrix and $V_2$ denotes a right singular matrix obtained through a Singular Vector Decomposition (SVD) operation of a channel matrix between the RS and the MS. Herein, the SVD operation is given by Equation 2

$$H_{R2} = U_2 \Sigma_2 V_2^H \qquad [\text{Eqn. 2}]$$

In Equation 2, $H_{R2}$ denotes the channel matrix between the RS and the MS, $U_2$ denotes a left singular matrix obtained through the SVD operation of the channel matrix between the RS and the MS, $\Sigma_2$ denotes a diagonal matrix including singular values, and $V_2$ denotes the right singular matrix obtained through the SVD operation of the channel matrix between the RS and the MS.

When a channel capacity between the RS 230 and the BS 210 is greater than a channel capacity between the RS 230 and the MS 220, the linear precoding matrix determined based on Equation 1 is an optimum solution for the performance enhancement of the channel between the RS 230 and the MS 220. In one exemplary embodiment of the present invention, a procedure for informing the BS 210 of the linear precoding matrix W is used so that the BS 210 can estimate an effective channel. Herein, the effective channel indicates the product of the channel between the RS 230 and the BS 210 by the linear precoding matrix W. Notably, in case of no reciprocity between an uplink channel and a downlink channel; that is, in case of a Frequency Division Duplex (FDD) system, the MS 220 needs to feed the channel matrix between the RS 230 and the MS 220 back to the RS 230.

Compared to one exemplary embodiment, another exemplary embodiment does not require the feedback of the channel information or the precoding matrix information. In addition, another exemplary embodiment applies the addition operation, rather than the XOR operation. Accordingly, the RS can different define a Modulation and Coding Scheme (MCS) level per symbol. Two-hop relay communications according to another exemplary embodiment of the present invention are shown in FIG. 3.

Figure 3:
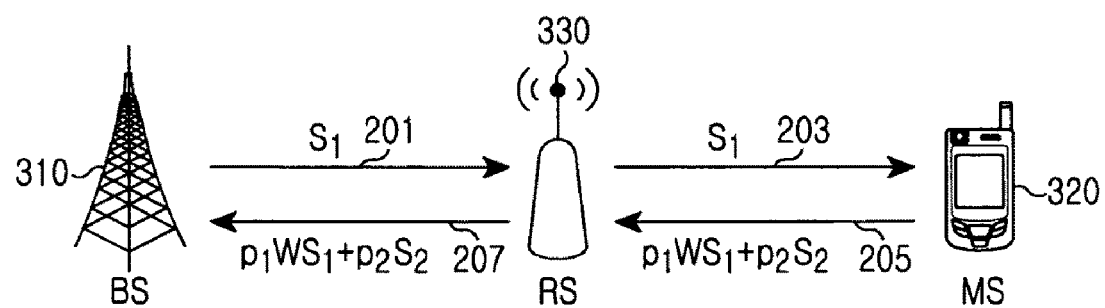
FIG. 3 illustrates relay communications in the relay wireless communication system according to another exemplary embodiment of the present invention.

In FIG. 3, the BS 310 transmits a symbol vector $S_1$ to the RS 330 in step 301 and the MS 320 transmits a symbol vector $S_2$ to the RS 330 in step 303. The RS 330 adds the symbol vector $S_1$ and the symbol vector $S_2$, precodes $S_1$, and applies a power coefficient to $S_1$ and $S_2$. Next, the RS 330 transmits the symbol vector $X_R$ with the precoding and the power coefficient applied to both of the BS 310 and the MS 320 at the same time in step 305. Herein, the precoding matrix W is given by Equation 1. The transmit signal of the RS 330 is expressed as Equation 3:

$$X_R = p_1 W S_1 + p_2 S_2 \qquad [\text{Eqn. 3}]$$

In Equation 3, $X_R$ denotes the transmit symbol vector of the RS, $p_1$ denotes a relay power coefficient for the BS, $p_2$ denotes a relay power coefficient for the MS, W denotes the precoding matrix, $S_1$ denotes the transmit symbol vector of the BS, and $S_2$ denotes the transmit symbol vector of the MS. Herein, the sum of the square ($=P_1^2$) of $P_1$ and the square ($=P_2^2$) of $P_2$ is less than or equal to 1. $P_1$ and $P_2$ can be set to fixed values based on an average gain of the channel, or to optimized value determined according to the transient variation of the channel.

The MS 320 receiving the signal from the RS 330 detects the transmit symbol vector of the BS 310 as follows.

The signal received at the MS 320 is given by Equation 4:

$$Y_2 = H_{R2}(p_1 W S_1 + p_2 S_2) + Z_2 \qquad [\text{Eqn. 4}]$$

In Equation 4, $Y_2$ denotes the received signal of the MS, $H_{R2}$ denotes the channel matrix between the RS and the MS, $p_1$ denotes the relay power coefficient for the BS, $p_2$ denotes the relay power coefficient for the MS, W denotes the precoding matrix, $S_1$ denotes the transmit symbol vector of the BS, $S_2$ denotes the transmit symbol vector of the MS, and $Z_2$ denotes a noise vector of the channel between the RS and the MS.

The MS 320 receiving the signal can acquire the channel matrix between the RS 330 and the MS 320 through the channel estimation, and thus diagonalizes the channel through linear equalization based on Equation 5:

$$R_2 = U_2^H (Y_2 - p_2 S_2) \qquad [\text{Eqn. 5}]$$
$$= p_2 \Sigma_2 S_1 + Z_2$$

In Equation 5, $R_2$ denotes the equalized signal, $U_2^H$ denotes a conjugate transpose matrix of the right singular matrix acquired through the SVD operation of the channel matrix between the RS and the MS, $Y_2$ denotes the received signal of the MS, $p_2$ denotes the relay power coefficient for the MS, $S_2$ denotes the transmit symbol vector of the MS, $\Sigma_2$ denotes the diagonal matrix including the singular values acquired from the SVD operation of the channel matrix between the RS and the MS, $S_1$ denotes the transmit symbol vector of the BS, and $Z_2$ denotes the noise vector of the channel between the RS and the MS.

By diagonalizing the channel matrix based on Equation 5, the MS 320 can easily maximize the channel capacity using a Zero-Forcing (ZF) scheme or a Minimum Mean Square Error (MMSE) scheme.

The BS 310 receiving the signal from the RS 330 detects the transmit symbol vector of the MS 320 as follows.

Unlike the MS 320, as not knowing the channel matrix between the RS 330 and the MS 320, the BS 310 cannot utilize the same manner as the MS 320. Thus, the BS 310 detects the transmit symbol vector of the MS 320 using a blind decoding scheme. The signal received at the BS 310 is given by Equation 6:

$$Y_1 = H_{R1}(p_1 W S_1 + p_2 S_2) + Z_1 \quad [\text{Eqn. 6}]$$

In Equation 6, $Y_1$ denotes the received signal of the BS, $H_{R1}$ denotes the channel matrix between the RS and the BS, $p_1$ denotes the relay power coefficient for the BS, W denotes the precoding matrix, $S_1$ denotes the transmit symbol vector of the BS, $p_2$ denotes the relay power coefficient for the MS, $S_2$ denotes the transmit symbol vector of the MS, and $Z_1$ denotes a noise vector of the channel between the RS and the BS.

Given that an estimation value of the transmit symbol vector of the MS 320 is $\hat{S}_2$, the BS 310 attempts interference cancellation using the estimation value based on Equation 7. Herein, the interference cancellation removes the component of the transmit symbol vector of the MS and extracts only the transmit symbol vector component of the BS.

$$R_1|_{\hat{S}_2} = H_{R1}^{-1}(Y_1 - p_2 H_{R1} \hat{S}_2) \quad [\text{Eqn. 7}]$$
$$= p_2(S_2 - \hat{S}_2) + p_1 W S_1 + \tilde{Z}$$

In Equation 7, $R_1$ denotes the received signal with the interference cancelled, $H_{R1}$ denotes the channel matrix between the RS and the BS, $Y_1$ denotes the received signal of the BS, $p_1$ denotes the relay power coefficient for the BS, $\hat{S}_2$ denotes the estimation value of the transmit symbol vector of the MS, $S_2$ denotes the transmit symbol vector of the MS, W denotes the precoding matrix, and $\tilde{Z}$ denotes a noise vector ($=H_R^{-1} Z_1$) multiplied by the inverse matrix of the channel between the RS and the BS.

After receiving L-ary symbol vectors over L-ary time slots, the BS 310 cancelling the interference based on Equation 7 determines a difference value between the power of the interference-cancelled received signal and the power of the transmit signal based on Equation 8. To ease the understanding, the difference value between the transmit signal power of the BS extracted from the received signal using the estimation value of the transmit symbol vector of the MS, and the transmit signal power of the BS is referred to as a power difference value.

$$\gamma 1|_{\hat{S}_2(:,1)} = (R_1(:,1)|_{\hat{S}_2})^H (R_1(:,1)|_{\hat{S}_2}) - \quad [\text{Eqn. 8}]$$
$$p_1^2 \|S_1(:,1)\|^2$$
$$= p_2^2 (S_2(:,1) - \hat{S}_2(:,1))^H$$
$$(S_2(:,1) - \hat{S}_2(:,1)) +$$
$$p_1 p_2 \text{Re} \left\{ \begin{array}{c} (S_2(:,1) - \hat{S}_2(:,1))^H \\ W S_1(:,1) \end{array} \right\} +$$
$$2 p_2 \text{Re}\{(S_2(:,1) - \hat{S}_2(:,1))^H$$
$$\tilde{Z}(:,1)\} +$$
$$2 p_1 \text{Re}\{S_1(:,1)^H W^H \tilde{Z}(:,1)\} +$$
$$\tilde{Z}(:,1)^H \tilde{Z}(:,1)$$
$$= K_1 + \xi_1$$

In Equation 8, $A(:,l)$ denotes an l-th column of a matrix A and indicates a vector corresponding to the l-th physical time slot of the L-ary time slots. $\gamma_l$ denotes the power difference value for the l-th time slot, $R_1(:,l)$ denotes the interference-cancelled receive signal vector for the l-th time slot, $p_1$ denotes the relay power coefficient for the BS, $S_1(:,l)$ denotes the transmit symbol vector of the BS for the l-th time slot, $p_2$ denotes the relay power coefficient for the MS, $S_2(:,l)$ denotes the transmit symbol vector of the MS for the l-th time slot, $\hat{S}_2(:,l)$ denotes the estimation value of the transmit symbol vector of the MS for the l-th time slot, W denotes the precoding matrix, $\tilde{Z}(:,l)$ denotes the noise vector multiplied by the inverse matrix of the channel between the RS and the BS for the l-th time slot, $K_l$ denotes an error value resulted from the estimation value for the l-th time slot, and $\xi_l$ denotes an error value resulted from the noise for the l-th time slot. Hereafter, to ease the understanding of the present invention, the error value resulted from the estimation value is referred to as an estimation error value and the error value resulted from the noise is referred to as a noise error value.

Herein, the estimation error value and the noise error value are given by Equation 9:

$$K_l = p_2^2 (S_2(:,l) - \hat{S}_2(:,l))^H (S_2(:,l) - \hat{S}_2(:,l)) + p_1 p_2 \text{Re}\{(\hat{S}_2(:,l) - \hat{S}_2(:,l))^H W S_1(:,l)\}$$

$$\xi_l = 2 p_2 \text{Re}\{(S_2(:,l) - \hat{S}_2(:,l))^H \tilde{Z}(:,l)\} + 2 p_1 \text{Re}\{S_1(:,l)^H W^H \tilde{Z}(:,l)\} + \tilde{Z}(:,l)^H \tilde{Z}(:,l) \quad [\text{Eqn. 9}]$$

In Equation 9, $K_l$ denotes the estimation error value for the l-th time slot, $p_2$ denotes the relay power coefficient for the MS, $S_2(:,l)$ denotes the transmit symbol vector of the MS for the l-th time slot, $\hat{S}_2(:,l)$ denotes the estimation value of the transmit symbol vector of the MS for the l-th time slot, $p_1$ denotes the relay power coefficient for the BS, W denotes the precoding matrix, $S_1(:,l)$ denotes the transmit symbol vector of the BS for the l-th time slot, $\xi_l$ denotes the noise error value for the l-th time slot, and $\tilde{Z}(:,l)$ denotes the noise vector multiplied by the inverse matrix of the channel between the RS and the BS for the l-th time slot.

When the estimation value of the transmit symbol vector of the MS 320 is accurate, the estimation error value and the noise error value of Equation 9 are expressed as Equation 10:

$$K_1|_{\hat{S}_2(:,l) = S_2(:,l)} = 0 \quad \xi_l|_{\hat{S}_2(:,l) = S_2(:,l)} = 2 p_1 \text{Re}\{S_1(:,l)^H W^H \tilde{Z}(:,l)\} + \tilde{Z}(:,l)^H \tilde{Z}(:,l) \quad [\text{Eqn. 10}]$$

In Equation 10, $K_l$ denotes the estimation error value for the l-th time slot, $S_2(:,l)$ denotes the transmit symbol vector of the MS for the l-th time slot, $\hat{S}_2(:,l)$ denotes the estimation value of the transmit symbol vector of the MS for the l-th time slot, denotes the noise error value for the l-th time slot, $p_1$ denotes the relay power coefficient for the BS, $S_1(:,l)$ denotes the transmit symbol vector of the BS for the l-th time slot, W denotes the precoding matrix, and $\tilde{Z}(:,l)$ denotes the noise vector multiplied by the inverse matrix of the channel between the RS and the BS for the l-th time slot.

When the estimation value $\hat{S}(:,l)$ of the transmit symbol vector of the MS 320 is identical to the transmit symbol vector $S_2(:,l)$ of the MS 320, the power difference value is close to zero in disregard of the error value caused by the noise. Thus, even when not knowing the precoding matrix, the BS 310 detects the transmit symbol vector of the MS 320 by seeking the estimation value which approaches the power difference value to zero most approximately through an exhaustive search on every case. For doing so, the BS 310 utilizes a Maximum Likelihood (ML) detection scheme or a Least Square (LS) scheme which minimizes the probability error.

First, the ML scheme used by the BS 310 to detect the signal is described. In conformity with the ML scheme, the transmit symbol vector of the MS 320 is determined based on Equation 11:

$$\hat{S}_2^{opt}(:,1) = \arg\max_{S_2(:,1)\in M} P(\gamma_1 \mid S_2(:,1), \hat{S}_2(:,1) = S_2(:,1)) \quad \text{[Eqn. 11]}$$

In Equation 11, $\hat{S}_2^{opt}(:,l)$ denotes an optimum estimation value for the l-th time slot, $S_2(:,l)$ denotes the transmit symbol vector of the MS for the l-th time slot, M denotes a set including all of possible symbol vectors, $\gamma_l$ denotes the power difference value for the l-th time slot, and $\hat{S}_2(:,l)$ denotes the estimation value of the transmit symbol vector of the MS for the l-th time slot.

When the estimation value is accurate, the probability distribution of the power difference value is given by Equation 12:

$$P(\gamma_1 \mid S_2(:,1), \hat{S}_2(:,1) = S_2(:,1)) \quad \text{[Eqn. 12]}$$
$$= P\begin{pmatrix} \gamma_1 = 2p_1 \mathrm{Re}\{S_1(:,1)^H W^H H_{R1}^{-1} Z_1(:,1)\} + \\ Z_1(:,1)^H (H_{R1}^{-1})^H H_{R1}^{-1} Z_1(:,1) \end{pmatrix}$$
$$= P(\gamma_1 = \xi_1 \mid_{\hat{S}_2(:,1)=S_2(:,1)})$$

In Equation 12, $\gamma_l$ denotes the power difference value for the l-th time slot, $S_2(:,l)$ denotes the transmit symbol vector of the MS for the l-th time slot, $\hat{S}_2(:,l)$ denotes the estimation value of the transmit symbol vector of the MS for the l-th time slot, $p_1$ denotes the relay power coefficient for the BS, W denotes the precoding matrix, $H_{R1}$ denotes the channel matrix between the RS and the BS, $Z_1(:,l)$ denotes a noise vector of the channel between the RS and the BS for the l-th time slot, and $\xi_l$ denotes the noise error value for the l-th time slot.

As expressed in Equation 12, when the estimation value is accurate, the probability distribution of the power difference value matches the probability distribution of the noise error value. To acquire the probability distribution of the error caused by the noise, precoding matrix information is needed. However, another exemplary embodiment does not provide a process for providing the precoding matrix information to the BS 310. Provided that the precoding matrix is the identity matrix, the probability distribution of the noise error value is given by Equation 13:

$$\xi_l \mid_{\hat{S}_2(:,l)=S_2(:,l)} = 2p_1 Re\{S_1(:,l)^H H_{R1}^{-1} Z_1(:,l)\} + Z_1(:,l)^H (H_{R1}^{-1})^H H_{R1}^{-1} Z_1(:,l) \quad \text{[Eqn. 13]}$$

In Equation 13, denotes the noise error value for the l-th time slot on the assumption that the precoding matrix is the identity matrix, $S_1(:,l)$ denotes the transmit symbol vector of the BS for the l-th time slot, $p_1$ denotes the relay power coefficient for the BS, $H_{R1}$ denotes the channel matrix between the RS and the BS, and $Z_1(:,l)$ denotes the noise vector of the channel between the RS and the BS for the l-th time slot.

Figure 4:
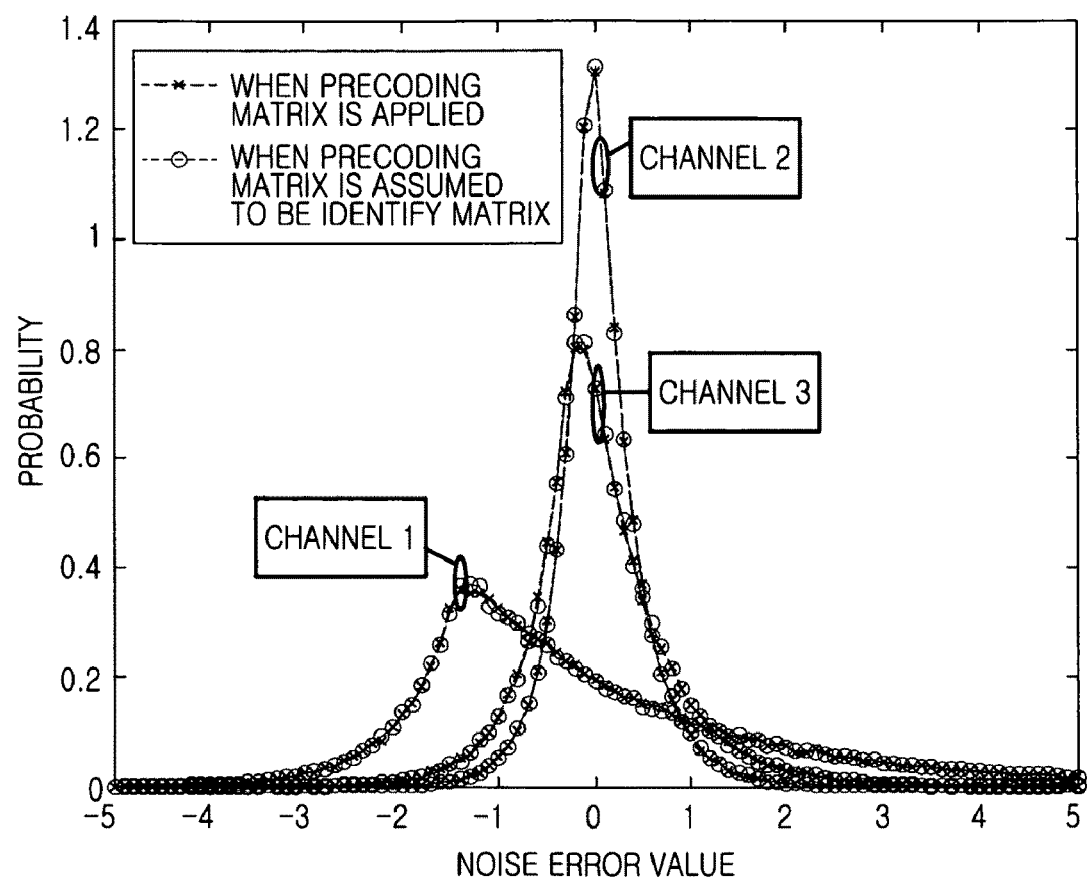
FIG. 4 illustrates probability distribution of a noise error value in the relay wireless communication system according to an exemplary embodiment of the present invention.

The probability distribution of the noise error value on the assumption that the precoding matrix is the identity matrix based on Equation 13 and the probability distribution of the original noise error value are shown in FIG. 4. As the probability distribution of the noise error value on the assumption that the precoding matrix is the identity matrix and the probability distribution of the original noise error value are precisely identical, the BS 310 uses the probability distribution of the noise error value on the assumption that the precoding matrix is the identity matrix instead of the probability distribution of the original noise error value.

To determine the probability distribution of the noise error value on the assumption that the precoding matrix is the identity matrix, the BS 310 determines the noise error value on the assumption that the precoding matrix is the identity matrix based on Equation 14:

$$\xi_l \mid_{\hat{S}_2(:,l)=S_2(:,l)} = (\bar{z}_1 - B^{-1}x_1)^T B(\bar{z}_1 - B^{-1}x_1) - \quad \text{[Eqn. 14]}$$
$$x_1^T B^{-1} x_1$$
$$= w_l^T B w_l - N$$
$$N = x_l^T B x_l = \|S_1(:,l)\|^2$$
$$x_l = -p_1 \begin{bmatrix} \mathrm{Re}\{(H_{R1}^{-1})^H S_1(:,l)\} \\ \mathrm{Im}\{(H_{R1}^{-1})^H S_1(:,l)\} \end{bmatrix}$$
$$\bar{z}_l = \begin{bmatrix} \mathrm{Re}\{Z_1(:,l)\} \\ \mathrm{Im}\{Z_1(:,l)\} \end{bmatrix}$$
$$B = \begin{bmatrix} \mathrm{Re}\{H_{R1}^{-1}\} & -\mathrm{Im}\{H_{R1}^{-1}\} \\ \mathrm{Im}\{H_{R1}^{-1}\} & \mathrm{Re}\{H_{R1}^{-1}\} \end{bmatrix}^T \begin{bmatrix} \mathrm{Re}\{H_{R1}^{-1}\} & -\mathrm{Im}\{H_{R1}^{-1}\} \\ \mathrm{Im}\{H_{R1}^{-1}\} & \mathrm{Re}\{H_{R1}^{-1}\} \end{bmatrix}$$

In Equation 14, $\xi_l$ denotes the noise error value for the l-th time slot on the assumption that the precoding matrix is the identity matrix, $w_l$ denotes a real-valued Gaussian random vector, $p_1$ denotes the relay power coefficient for the BS, $H_{R1}$ denotes the channel matrix between the RS and the BS, $S_1(:,l)$ denotes the transmit symbol vector of the BS for the l-th time slot, and $Z_1(:,l)$ denotes the noise vector of the channel between the RS and the BS for the l-th time slot.

The probability distribution of the noise error value on the assumption that the precoding matrix is the identity matrix is given by Equation 15:

$$P(\tilde{\xi}_l \mid_{\hat{S}_2(:,l)=S_2(:,l)}) = \frac{1}{\pi} \int_0^\infty \frac{\cos\alpha(t, \tilde{\xi}_l \mid_{\hat{S}_2(:,l)=S_2(:,l)})}{\beta(t)} dt \quad \text{[Eqn. 15]}$$
$$\alpha(t, \tilde{\xi}_l) = \sum_{i=1}^{\bar{N}} \left[\frac{f_i}{2} \arctan(2t\lambda_i) + \delta_i^2 t\lambda_i(1+4t^2\lambda_i^2)^{-1}\right] - (\tilde{\xi}_l + N)t$$
$$\beta(t) = \prod_{i=1}^{\bar{N}} \left[(1+4t^2\lambda_i^2)^{f_i/4}\right] \exp\left\{2t^2 \sum_{j=1}^{\bar{N}} (\delta_j^2\lambda_j^2)/(1+4t^2\lambda_j^2)\right\}$$
$$\delta_i^2 = \sum_{q=1}^{f_i} \eta_{iq}^2$$

In Equation 15, $\tilde{\xi}_l$ denotes the noise error value for the l-th time slot on the assumption that the precoding matrix is the identity matrix, $S_2(:,l)$ denotes the transmit symbol vector of the MS for the l-th time slot, $\hat{S}_2(:,l)$ denotes the estimation value of the transmit symbol vector of the MS for the l-th time slot, $\bar{N}$ denotes a rank of the matrix B in Equation 14; that is, denotes the number of linearly independent row vectors, $\lambda_i$ denotes distinct non-zero eigenvalues of the matrix $$\left(=\frac{N_0}{2}B\right)$$

acquired by dividing the product of the matrix B and the noise power by 2, $f_i$ denotes respective orders of multiplicity of $\lambda_i$; that is, denotes the number of eigenvectors having $\lambda_i$ as the eigenvalue, and $\eta_{iq}$ denotes the element of $\Omega^{-1}\mu/\sqrt{N_0/2}$ corresponding to the same $\lambda_i$. Herein, $\Omega$ denotes an orthogonal matrix including the eigenvectors of the matrix B, and, $\mu$ denotes $-B^{-1}x_l$. B and $x_l$ are the matrixes defined in Equation 14.

The probability distribution of the power difference value is given by Equation 16:

$$P(\gamma_l | S_2(:,l), \hat{S}_2(:,l) = S_2(:,l)) = P(\tilde{\xi}_l |_{\hat{S}_2(:,l)=S_2(:,l)} = \gamma_l) \quad \text{[Eqn. 16]}$$
$$= \frac{1}{\pi}\int_0^\infty \frac{\cos\alpha(t, \gamma_l)}{\beta(t)} dt$$

In Equation 16, $\gamma_l$ denotes the power difference value for the l-th time slot, $S_2(:,l)$ denotes the transmit symbol vector of the MS for the l-th time slot, $\hat{S}_2(:,l)$ denotes the estimation value of the transmit symbol vector of the MS for the l-th time slot, $\tilde{\xi}_l$ denotes the noise error value for the l-th time slot on the assumption that the precoding matrix is the identity matrix, and $\alpha(t,\gamma_l)$ and $\beta(t)$ denote the variables defined in Equation 15.

To determine the probability distribution of the power difference value, the BS 310 uses Equation 17 by converting the Equation 16 of the integral form into the sum form.

$$P(\gamma_l | S_2(:,l), \hat{S}_2(:,l)) = \frac{1}{\pi}\sum_{j=1}^{J} \frac{\cos\alpha(t_j, \gamma_l)}{\beta(t_j)} \cdot \frac{T_U}{J} \quad \text{[Eqn. 17]}$$

In Equation 17, $\gamma_l$ denotes the power difference value for the l-th time slot, $S_2(:,l)$ denotes the transmit symbol vector of the MS for the l-th time slot, $\hat{S}_2(:,l)$ denotes the estimation value of the transmit symbol vector of the MS for the l-th time slot, $T_U$ denotes an ending point of $t_j$, and J denotes the number of indexes $t_j$. Herein, $T_U$ is a truncation point which satisfies Equation 18:

$$\left|\frac{1}{\pi}\int_{T_U}^\infty \frac{\cos\alpha(t, \gamma_l)}{\beta(t)} dt\right| \le E_T \quad \text{[Eqn. 18]}$$

In Equation 18, $\alpha(t,\gamma_l)$ and $\beta(t)$ denote the variables defined in Equation (15), $T_U$ is the ending point, and $E_T$ denotes an error tolerance.

The BS 310 detects the transmit symbol vector of the MS 320 based on Equation 19:

$$\hat{S}_2^{opt} = \arg\max_{\hat{S}_2 \in M} P(\gamma_l | S_2(:,l)) \quad \text{[Eqn. 19]}$$
$$= \arg\max_{\hat{S}_2 \in M} \frac{1}{\pi}\sum_{j=1}^{J} \frac{\cos\alpha(t_j, \gamma_l)}{\beta(t_j)} \cdot \frac{T_U}{J}$$

In Equation 19, $\hat{S}_2^{opt}$ denotes an optimum estimation value of the transmit symbol vector of the MS, $\hat{S}_2$ denotes the estimation value of the transmit symbol vector of the MS, M is a set including all of the possible symbol vectors, $\gamma_l$ denotes the power difference value for the l-th time slot, $S_2(:,l)$ denotes the transmit symbol vector of the MS for the l-th time slot, $\alpha(t,\gamma_l)$ and $\beta(t)$ denote the variables defined in Equation 15, $T_U$ denotes the ending point of $t_j$, and J denotes the number of the indexes $t_j$.

Next, the LS scheme used by the BS 310 to detect the signal is described. Using the LS scheme, a cost function is used rather than the probability distribution. The cost uses the error value between the power difference value obtained from Equation 8 and the noise error value obtained from Equation 10. Thus, the cost function is defined as Equation 20:

$$\epsilon = E_{\tilde{Z}}\|\gamma_l - 2Re\{S_1(:,l)^H W^H \tilde{Z}(:,l)\} - \tilde{Z}(:,l)^H \hat{Z}(:,l)\|^2 \quad \text{[Eqn. 20]}$$

In Equation 20, E denotes the cost function, $E_a$ denotes an average operator for a, $\gamma_l$ denotes the power difference value for the l-th time slot, $S_1(:,l)$ denotes the transmit symbol vector of the BS for the l-time slot, W denotes the precoding matrix, and $\tilde{Z}(:,l)$ denotes the noise vector multiplied by the inverse matrix of the channel between the RS and the BS for the l-th time slot.

Thus, by determining the power difference value which minimizes the result of the cost function, the BS 310 detects the transmit symbol vector of the MS 320. By considering that the cost function is the convex function, the power difference value minimizing the result of the cost function is attained by differentiating the cost function. That is, the power difference value minimizing the result of the cost function is acquired by determining the solution of Equation 21:

$$\frac{d\varepsilon}{d\gamma_l}\bigg|_{\gamma_l=y_l^{opt}} = E_{\tilde{Z}}\big(2\gamma_l - 4Re\{S_1(:,l)^H W^H \tilde{Z}(:,l)\} - \quad \text{[Eqn. 21]}$$
$$2\tilde{Z}(:,l)^H Z(:,l)\big)\big|_{\gamma_l=y_l^{opt}}$$
$$= 2\gamma_l - 2E_{\tilde{Z}}\big(Z_1(:,l)^H (H_{R1}^{-1})^H H_{R1}^{-1} Z_1(:,l)\big)$$
$$= 2\gamma_l - 2N_0^{(1)} tr\big[H_{R1}^{-1}(H_{R1}^{-1})^H\big]$$
$$= 0$$

In Equation 21, $\epsilon$ denotes the cost function, $\gamma_l$ denotes the power difference value for the l-th time slot, $S_1(:,l)$ denotes the transmit symbol vector of the BS for the l-time slot, W denotes the precoding matrix, $\tilde{Z}(:,l)$ denotes the noise vector multiplied by the inverse matrix of the channel between the RS and the BS for the l-th time slot, $H_{R1}$ denotes the channel matrix between the RS and the BS, $N_0^{(1)}$ denotes the noise power, and tr[ ] denotes a trace operator. Herein, the trace operator indicates the sum of the diagonal elements.

Thus, the optimum power difference value minimizing the result of the cost function is expressed in Equation 22, and the symbol vector which approaches the power difference value to the result of Equation 22 most approximately is detected as the transmit symbol vector of the MS 320.

$$\gamma_l^{opt} = N_0^{(1)} tr\big[H_{R1}^{-1}(H_{R1}^{-1})^H\big] \quad \text{[Eqn. 22]}$$

In Equation 22, $\gamma_l^{opt}$ denotes the optimum power difference value, $N_0^{(1)}$ denotes the noise power, tr[ ] denotes the trace operator, and $H_{R1}$ denotes the channel matrix between the RS and the BS.

According to the detection scheme mentioned above, the transmit symbol vector satisfying the condition is determined as the detection result, which can be a kind of hard decision. However, to determine Log Likelihood Ratios (LLRs) per bit according to the soft decision, the BS 310 determines the LLR as follows.

The LLR of the i-th code bit received via the n-th antenna is given by Equation 23:

$$LLR_{n,i} = \frac{P(C_2(n,i) = 1 \mid Y_1(:,l))}{P(C_2(n,i) = 0 \mid Y_1(:,l))} \quad \text{[Eqn. 23]}$$

In Equation 23, $LLR_{n,i}$ denotes the LLR of the i-th code bit received via the n-th antenna, $C_2(n,i)$ denotes a transmit value of the i-th code bit received via the n-th antenna, and $Y_1(:,l)$ denotes a receive symbol vector of the BS for the l-th time slot.

Herein, the probability that the i-th code bit received via the n-th antenna is 1 is expressed in Equation 24:

$$P(C_2(n,i) = 1 \mid Y_1(:,l)) = \sum_{S_2(:,l) \in S^1_{n,[i]M}} P(S_2(:,l) \mid Y_1(:,l)) \quad \text{[Eqn. 24]}$$

$$= \sum_{S_2(:,l) \in S^1_{n,[i]M}} P(Y_1(:,l) \mid S_2(:,l))$$

$$= \sum_{S_2(:,l) \in S^1_{n,[i]M}} P\left( \begin{array}{c} \gamma_l \mid S_2(:,l), \\ \hat{S}_2(:,l) = S_2(:,l) \end{array} \right)$$

$$\gamma_l = \left( \begin{array}{c} H_{R1}^{-1}(Y_1(:,l) - \\ p_2 H_{R1} S_2(:,l)) \end{array} \right)^H \left( \begin{array}{c} H_{R1}^{-1}(Y_1(:,l) - \\ p_2 H_{R1} S_2(:,l)) \end{array} \right) - p_1^2 N$$

In Equation 24, $C_2(n,i)$ denotes the transmit value of the i-th code bit received via the n-th antenna, $Y_1(:,l)$ denotes the receive symbol vector of the BS for the l-th time slot, $S_2(:,l)$ denotes the transmit symbol vector of the MS for the l-th time slot, $\gamma_l$ denotes the power difference value for the l-th time slot, $\hat{S}_2(:,l)$ denotes the estimation value of the transmit symbol vector of the MS for the l-th time slot, $S_{n,[i]M}^1$ denotes a set of symbol vectors in which the i-th code bit of the n-th antenna is 1, $H_{R1}$ denotes the channel matrix between the RS and the BS, $p_2$ denotes the relay power coefficient for the MS, $p_1$ denotes the relay power coefficient for the BS, and N denotes the number of the antennas.

Since the probability distribution of the power difference value is expressed as in Equation 12, the probability that the transmit value of the i-th code bit received via the n-th antenna is '1' is given by Equation 25:

$$P(C_2(n,i) = 1 \mid Y_1(:,l)) = \sum_{S_2(:,l) \in S^1_{n,[i]M}} P(\gamma_l = \tilde{\xi}_l \mid_{\hat{S}_2(:,l) = S_2(:,l)}) \quad \text{[Eqn. 25]}$$

$$= \sum_{S_2(:,l) \in S^1_{n,[i]M}} \frac{1}{\pi} \int_0^\infty \frac{\cos\alpha(t,\gamma_1)}{\beta(t)} dt$$

In Equation 25, $C_2(n,i)$ denotes the transmit value of the i-th code bit received via the n-th antenna, $Y_1(:,l)$ denotes the receive symbol vector of the BS for the l-th time slot, $S_2(:,l)$ denotes the transmit symbol vector of the MS for the l-th time slot, $S_{n,[i]M}^1$ denotes the set of the symbol vectors in which the i-th code bit of the n-th antenna is 1, $\gamma_l$ denotes the power difference value for the l-th time slot, $\tilde{\xi}_l$ denotes the noise error value for the l-th time slot on the assumption that the precoding matrix is the identity matrix, $\hat{S}_2(:,l)$ denotes the estimation value of the transmit symbol vector of the MS for the l-th time slot, and $\alpha(t,\gamma_l)$ and $\beta(t)$ denote the variables defined in Equation 15.

To determine the probability that the i-th code bit received via the n-th antenna is 1, the BS 310 uses Equation 26 by converting Equation 25 of the integral form into the sum form.

$$P(C_2(n,i) = 1 \mid Y_1(:,l)) = \sum_{S_2(:,l) \in S^1_{n,[i]M}} \frac{1}{\pi} \sum_{j=1}^J \frac{\cos\alpha(t_j,\gamma_l)}{\beta(t_j)} \cdot \frac{T_U}{J} \quad \text{[Eqn. 26]}$$

In Equation 26, $C_2(n,i)$ denotes the transmit value of the i-th code bit received via the n-th antenna, $Y_1(:,l)$ denotes the receive symbol vector of the BS for the l-th time slot, $S_2(:,l)$ denotes the transmit symbol vector of the MS for the l-th time slot, $S_{n,[i]M}^1$ denotes the set of the symbol vectors in which the i-th code bit of the n-th antenna is 1, $\gamma_l$ denotes the power difference value for the l-th time slot, $\alpha(t,\gamma_l)$ and $\beta(t)$ denote the variables defined in Equation 15, $T_U$ denotes the ending point of $t_j$, and J denotes the number of the indexes $t_j$.

Likewise, the probability that the i-th code bit received via the n-th antenna is 0 is determined based on Equation 27:

$$P(C_2(n,i) = 0 \mid Y_1(:,l)) = \sum_{S_2(:,l) \in S^0_{n,[i]M}} \frac{1}{\pi} \sum_{j=1}^J \frac{\cos\alpha(t_j,\gamma_l)}{\beta(t_j)} \cdot \frac{T_U}{J} \quad \text{[Eqn. 27]}$$

In Equation 27, $C_2(n,i)$ denotes the transmit value of the i-th code bit received via the n-th antenna, $Y_1(:,l)$ denotes the receive symbol vector of the BS for the l-th time slot, $S_2(:,l)$ denotes the transmit symbol vector of the MS for the l-th time slot, $S_{n,[i]M}^0$ denotes the set of the symbol vectors in which the i-th code bit of the n-th antenna is 0, $\gamma_l$ denotes the power difference value for the l-th time slot, $\alpha(t,\gamma_l)$ and $\beta(t)$ denote the variables defined in Equation 15, $T_U$ denotes the ending point of $t_j$, and J denotes the number of the indexes $t_j$.

The BS 310 determines the LLRs per bit using the probability values determined based on Equation 26 and Equation 27 and carries out the decoding using the LLRs per bit. At this time, when adopting the decoding scheme, such as Viterbi scheme, requiring the received signal value, the BS 310 uses an equivalent received signal defined as Equation 28:

$$\tilde{Y}_1 = S_2 + Z_{eq} \quad \text{[Eqn. 28]}$$

In Equation 28, $\tilde{Y}$ denotes the equivalent received signal, $S_2$ denotes the transmit symbol vector of the MS, and $Z_{eq}$ denotes an equivalent noise.

When using a Binary Phase Shift Keying (BPSK) scheme, the LLRs per bit are given by Equation 29:

$$LLR_{n,i} = \log \frac{P(\tilde{Y}_1(n,i) \mid S_2(n,i) = 1)}{P(\tilde{Y}_1(n,i) \mid S_2(n,i) = -1)} \quad \text{[Eqn. 29]}$$

$$= 2\log \frac{\exp\{-(\tilde{Y}_1(n,i) - 1)^2 / N_0^{eq}\}}{\exp\{-(\tilde{Y}_1(n,i) + 1)^2 / N_0^{eq}\}}$$

$$= \frac{4\tilde{Y}_1(n,i)}{N_0^{eq}}$$

In Equation 29, $LLR_{n,i}$ denotes the LLR of the i-th code bit received via the n-th antenna, $\tilde{Y}_1(n,i)$ denotes the received value of the i-th code bit received via the n-th antenna among the equivalent received signals of the BS, $S_2(n,i)$ denotes the transmit value of the i-th code bit received via the n-th antenna, and $N_0^{eq}$ denotes the equivalent noise power.

Using the LLRs per bit, the BS 310 determines the equivalent received signal based on Equation 30:

$$\tilde{Y}_1(n, i) = \frac{N_0^{eq} \cdot LLR_{n,i}}{4} \quad [\text{Eqn. 30}]$$

In Equation 30, $\tilde{Y}_1(n,i)$ denotes the receive value of the i-th code bit received via the n-th antenna among the equivalent received signals of the BS, $N_0^{eq}$ denotes the equivalent noise power, and $LLR_{n,i}$ denotes the LLR of the i-th code bit received via the n-th antenna.

As described above, the BS 310 can detect the transmit symbol vector of the MS 320 through the soft decoding using the LLRs per bit, or the soft decision according to the ML scheme. By additionally applying a Successive Interference Cancellation (SIC) scheme, the BS 310 can enhance its detection performance. More particularly, when codewords are encoded per spatial stream, the BS 310 can cancel the interference between the antennas by applying the SIC scheme to the channel decoding process, and enhance its detection performance. For asymptotical approach of the performance to the channel capacity, the SIC scheme rejects the interference of the received signal interfered from the detected value using the pre-detected value and repeats the operation to detect the rest. In so doing, the key point of the SIC scheme is to determine the detection order. In particular, since the effective noise is totally different from the conventional noise in form, it is far more important to determine the detection order.

When the SIC scheme is applied, after the signal of the $j_k$-th antenna is detected in the k-th repetition phase, the interference in the received signal of the (k+1)-th repetition phase is rejected based on Equation 31:

$$Y_{1,k+1} = Y_{1,k} - p_2 H_{R1,k}(:,j_k) \cdot \hat{S}_2(j_k,:) \quad [\text{Eqn. 31}]$$

In Equation (31), $Y_{1,k}$ denotes the received symbol vector of the BS in the k-th repetition phase, $p_2$ denotes the relay power coefficient for the MS, $H_{R1,k}(:,j_k)$ denotes the $j_k$-th column of the channel matrix between the RS and the BS in the k-th repetition phase, and $\hat{S}_2(j_k,:)$ denotes the $j_k$-th row of the estimation value of the transmit symbol vector of the MS. Herein, $j_k$ corresponds to the antenna index.

After the k-th repetition phase, the $j_k$-th row of the channel matrix is substituted by 0 vector. In the k-th repetition phase, the effective noise is expressed as Equation 32:

$$\xi k, 1|_{\hat{S}_2(:,l)=S_2(:,l)} = 2p_1 \text{Re}\{S_1(:,l)^H H_{R1,k}^+ Z_1(:,l)\} + \quad [\text{Eqn. 32}]$$
$$Z_1(:,l)^H (H_{R1,k}^+)^H H_{R1,k}^+ Z_1(:,l)$$

In Equation 32, $\tilde{\xi}_l$ denotes the noise error value for the l-th time slot on the assumption that the precoding matrix is the identity matrix, $\hat{S}_2(:,l)$ denotes the estimation value of the transmit symbol vector of the MS for the l-th time slot, $S_2(:,l)$ denotes the transmit symbol vector of the MS for the l-th time slot, $p_1$ denotes the relay power coefficient for the BS, $S_1(:,l)$ denotes the transmit symbol vector of the BS for the l-th time slot, $H_{R1,k}^+$ denotes a Moore-Penrose inverse matrix of the channel matrix between the RS and the BS in the k-th repetition phase, and $Z_1(:,l)$ denotes the noise vector of the channel between the RS and the BS for the l-th time slot.

The Moore-Penrose inverse matrix is given by Equation 33:

$$H_{R1,k}^+ \equiv V_{R1,k} \begin{bmatrix} 1/\sigma_1 & & & \\ & \ddots & & \\ & & 1/\sigma_{N-k} & \\ & & & 0_{k \times k} \end{bmatrix} U_{R1,k}^H \quad [\text{Eqn. 33}]$$

In Equation 33, $H_{R1,k}^+$ denotes the Moore-Penrose inverse matrix of the channel matrix between the RS and the BS in the k-th repetition phase, $V_{R1,k}$ denotes a right singular matrix acquired from the SVD operation on the channel matrix between the RS and the BS in the k-th repetition phase, $\sigma_i$ denotes the i-th singular value of the channel matrix between the RS and the BS in the k-th repetition phase, and $U_{R1,k}^H$ denotes a left singular matrix acquired from the SVD operation on the channel matrix between the RS and the BS in the k-th repetition phase.

The variance of the effective noise is given by Equation 34:

$$\text{Var}\{\tilde{\xi}_{k,1}\|_{\hat{S}_2(:,l)=S_2(:,l)}\} = 2p_1^2 N_0^{(1)} tr((H_{R1,k}^{-1})^H H_{R1,k}^{-1}) + \sigma_1^4 tr[(H_{R1,k}^{-1}(H_{R1,k}^{-1})^H)^2] \quad [\text{Eqn. 34}]$$

In Equation 34, $\tilde{\xi}_l$ denotes the noise error value for the l-th time slot on the assumption that the precoding matrix is the identity matrix, $\hat{S}_2(:,l)$ denotes the estimation value of the transmit symbol vector of the MS for the l-th time slot, $S_2(:,l)$ denotes the transmit symbol vector of the MS for the l-th time slot, $p_1$ denotes the relay power coefficient for the BS, $N_0^{(1)}$ denotes the noise power, tr[ ] denotes the trace operator, $H_{R1,k}$ denotes the channel matrix between the RS and the BS in the k-th repetition phase, and $\sigma_i$ denotes the i-th singular value of the channel matrix between the RS and the BS in the k-th repetition phase.

In another exemplary embodiment, the relay power coefficients $p_1$ and $p_2$ can be set to the fixed values or to the optimized values determined based on the transient variation of the channel. Here, the optimization implies that the two-hop channels having the asymmetric quality attain the symmetric gains.

The probability of the correct detection; that is, the probability of the detection success is given by Equation 35:

$$\psi \approx \begin{cases} P\left\{\dfrac{K_l^-}{2} < \gamma \Big|_{\hat{S}_2(:,l)=S_2}\right\} & \text{if } K_l\big|_{m_i} \geq 0 \text{ for all } m_i \in M, \\ P\left\{\gamma \Big|_{\hat{S}_2(:,l)=S_2} < \dfrac{K_l^+}{2}\right\} & \text{if } K_l\big|_{m_i} \leq 0 \text{ for all } m_i \in M, \\ P\left\{\dfrac{K_l^-}{2} < \gamma \Big|_{\hat{S}_2(:,l)=S_2} < \dfrac{K_l^+}{2}\right\} & \text{otherwise,} \end{cases} \quad [\text{Eqn. 35}]$$

$$K_l^- = \max_{m_i \in M} K_l|\hat{S}_2(:,l) = m_i \text{ s.t. } K_l|\hat{S}_2(:,l) = m_i < 0$$

$$K_l^+ = \max_{m_i \in M} K_l|\hat{S}_2(:,l) = m_i \text{ s.t. } K_l|\hat{S}_2(:,l) = m_i > 0$$

In Equation 35, $\psi$ denotes the detection success probability, $K_l^-$ denotes the estimation error value less than zero for the l-th time slot, $K_l^+$ denotes the estimation error value greater than zero for the l-th time slot, $\gamma$ denotes the power difference value, $\hat{S}_2(:,l)$ denotes the estimation value of the transmit symbol vector of the MS for the l-th time slot, $S_2(:,l)$ denotes the transmit symbol vector of the MS for the l-th time slot, M denotes the set including all of the possible symbol vectors, and $m_i$ denotes the i-th element of M.

Provided that the probability distribution of the power difference value is the Gaussian distribution having the variance of Equation 34, the detection success probability is given by Equation 36:

$$\psi \approx \quad \text{[Eqn. 36]}$$

$$\begin{cases} Q\left(\dfrac{-K_l^+}{2\sqrt{(\text{Var}\{\zeta_l\mid_{\hat{S}_2(:,l)=S_2(:,l)}\})}}\right) & \text{if } K_l\mid_{m_i} \geq 0 \text{ for all } m_i \in M, \\ Q\left(\dfrac{K_l^-}{2\sqrt{(\text{Var}\{\zeta_l\mid_{\hat{S}_2(:,l)=S_2(:,l)}\})}}\right) & \text{if } K_l\mid_{m_i} \leq 0 \text{ for all } m_i \in M, \\ Q\left(\dfrac{-K_l^+}{2\sqrt{(\text{Var}\{\zeta_l\mid_{\hat{S}_2(:,l)=S_2(:,l)}\})}}\right) \\ \cdot Q\left(\dfrac{K_l^-}{2\sqrt{(Var\{\zeta_l\mid_{S_2(:,l)=S_2(:,l)}\})}}\right) & \text{otherwise,} \end{cases}$$

$$Q(x) = \int_x^\infty \frac{1}{\sqrt{2\pi}} \exp\left(-\frac{x^2}{2}\right) dt$$

In Equation 36, $\psi$ denotes the detection success probability, $K_l^-$ denotes the estimation error value less than zero for the l-th time slot, $K_l^+$ denotes the estimation error value greater than zero for the l-th time slot, $\zeta_l$ denotes the noise error value for the l-th time slot, $Q(x)$ denotes a Gaussian Q function, $\hat{S}_2(:,l)$ denotes the estimation value of the transmit symbol vector of the MS for the l-th time slot, $S_2(:,l)$ denotes the transmit symbol vector of the MS for the l-th time slot, M denotes a set including all of the possible symbol vectors, and $m_i$ denotes the i-th element of M.

The detection success probability is expressed as the function of the equivalent received signal in Equation 37, Equation 38, and Equation 39 as follows. Equation 37, Equation 38, and Equation 39 assume a Pulse Amplitude Modulation (PAM) scheme. Equation 37 expresses the detection success probability when the transmit symbol is the smallest value of the points in the constellation, Equation 38 expresses the detection success probability when the transmit symbol is the greatest value of the points in the constellation, and Equation 39 expresses the detection success probability in other cases.

$$\psi_n = P\left\{\tilde{Y}_1(n,l) < \frac{a_1 + a_2}{2}\right\} \quad \text{[Eqn. 37]}$$

$$= \int_{-\infty}^{\frac{(a_1+a_2)}{2}} \frac{1}{\sqrt{2\pi N_0^{eq}}} \exp\left(-\frac{\left(\tilde{Y}_1(n,l) - a_1\right)^2}{2N_0^{eq}}\right) d\tilde{Y}_1(n,l)$$

$$= Q\left(\frac{a_1 - a_2}{2\sqrt{N_0^{eq}}}\right)$$

In Equation 37, $\psi_n$ denotes the detection success probability at the n-th antenna, $\tilde{Y}_1(n,l)$ denotes the receive value of the symbol received via the n-th antenna over the l-th time slot among the equivalent received signals of the BS, $a_i$ denotes the i-th symbol value in the constellation, $N_0^{eq}$ denotes the equivalent noise power, and Q( ) denotes the Gaussian Q function.

$$\psi_n = P\left\{\frac{a_{j-1}+a_j}{2} < \tilde{Y}_1(n,l) < \frac{a_j+a_{j+1}}{2}\right\} \quad \text{[Eqn. 38]}$$

-continued $$= Q\left(\frac{a_{j-1} - a_j}{2\sqrt{N_0^{eq}}}\right) - Q\left(\frac{a_{j+1} - a_j}{2\sqrt{N_0^{eq}}}\right)$$

In Equation 38, $\psi_n$ denotes the detection success probability at the n-th antenna, $\tilde{Y}_1(n,l)$ denotes the receive value of the symbol received via the n-th antenna over the l-th time slot among the equivalent received signals of the BS, $a_i$ denotes the i-th symbol value in the constellation, $N_0^{eq}$ denotes the equivalent noise power, and Q( ) denotes the Gaussian Q function.

$$\psi_n = P\left\{\tilde{Y}_1(n,l) > \frac{a_{M-1}+a_M}{2}\right\} \quad \text{[Eqn. 39]}$$

$$= Q\left(\frac{a_{M-1} - a_M}{2\sqrt{N_0^{eq}}}\right)$$

In Equation 39, $\psi_n$ denotes the detection success probability at the n-th antenna, $\tilde{Y}_1(n,l)$ denotes the receive value of the symbol received via the n-th antenna over the l-th time slot among the equivalent received signals of the BS, $a_i$ denotes the i-th symbol value in the constellation, $N_0^{eq}$ denotes the equivalent noise power, and Q( ) denotes the Gaussian Q function.

By combining the detection success probabilities based on Equation 37, Equation 38, and Equation 39, the detection success probability according to the BPSK scheme is given by Equation 40:

$$\psi_n = \begin{cases} P\{\tilde{Y}_1(n,l) < 0\} & \text{if } S_2(n,l) = -1 \\ P\{\tilde{Y}_1(n,l) > 0\} & \text{if } S_2(n,l) = 1 \end{cases} \quad \text{[Eqn. 40]}$$

$$= Q\left(-\frac{1}{\sqrt{N_0^{eq}}}\right)$$

In Equation 40, $\psi_n$ denotes the detection success probability, $\tilde{Y}_1(n,l)$ denotes the receive value of the symbol received via the n-th antenna over the l-th time slot among the equivalent received signals of the BS, $S_2(n,l)$ denotes the transmit symbol of the MS transmitted via the n-th antenna in the l-th time slot, $N_0^{eq}$ denotes the equivalent noise power, and Q( ) denotes the Gaussian Q function.

Hence, the equivalent noise vector is given by Equation 41:

$$N_0^{eq} = \frac{1}{\left(Q^{-1}\left(\sqrt[N]{\psi}\right)\right)^2} \quad \text{[Eqn. 41]}$$

In Equation (41), $N_0^{eq}$ denotes the equivalent noise power, Q( ) denotes the Gaussian Q function, $\psi$ denotes the detection success probability, and N denotes the number of the antennas. Herein, $\psi$ is the product of the detection success probabilities of the antennas.

An achievable rate from the RS 330 to the BS 310 and an achievable rate from the RS 330 to the MS 320 are approximated as Equation 42:

$$R_{R1} \approx N\log_2(1/N_0^{eq} + 1) \quad \text{[Eqn. 42]}$$

-continued
$$R_{R2} = \log_2\det(p_1^2 H_{R2} H_{R2}^H / N_0 + I_N)$$
$$= \sum_{i=1}^{N} \log_2\left(\frac{\sigma_{R2,i}^2 p_1^2}{N_0} + 1\right)$$

In Equation 42, $R_{R1}$ denotes the rate from the RS to the BS, $N_0^{eq}$ denotes the equivalent noise power, $R_{R2}$ denotes the rate from the RS to the MS, $p_1$ denotes the relay power coefficient for the BS, $H_{R2}$ denotes the channel matrix between the RS and the MS, $N_0$ denotes the noise power, $I_N$ denotes a N-sized identity matrix, N denotes the number of the antennas, and $\sigma_{R1,i}$ denotes the i-th singular value of the channel matrix between the RS and the BS.

Finally, $p_1$ and $p_2$ satisfying Equation 43 become the optimized power coefficients.

$$R_{R1} \approx N\log_2(1/N_0^{eq} + 1)\big|_{p_1^{opt}} \qquad [\text{Eqn. 43}]$$
$$= R_{R2}$$
$$= \sum_{i=1}^{N} \log_2\left(\frac{\sigma_{R2,i}^2 p_1^2}{N_0} + 1\right)\bigg|_{p_1^{opt}}$$
$$p_2 = \sqrt{1 - p_1^2}$$

In Equation 43, $R_{R1}$ denotes the rate from the RS to the BS, N denotes the number of the antennas, $N_0^{eq}$ denotes the equivalent noise power, $R_{R2}$ denotes the rate from the RS to the MS, $p_1$ denotes the relay power coefficient for the BS, $N_0$ denotes the noise power, $I_N$ denotes the N-sized identity matrix, $\sigma_{R1,i}$ denotes the i-th singular value of the channel matrix between the RS and the BS, and $p_2$ denotes the relay power coefficient for the MS.

Now, operations and structures of the BS, the MS and the RS which carry out the relay communication as stated above are elucidated by referring to the drawings.

Figure 5:
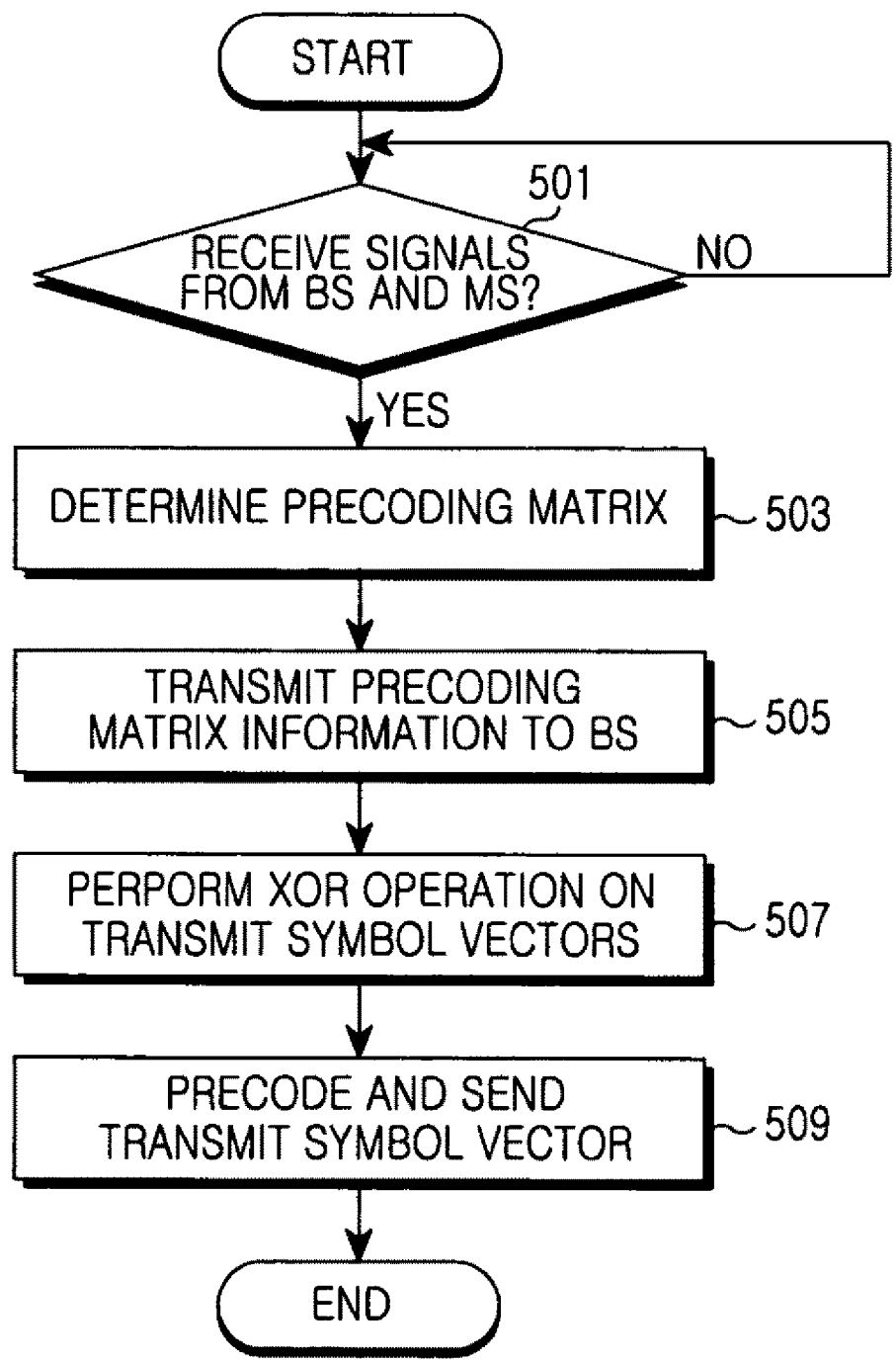
FIG. 5 illustrates operations of a relay station in the relay wireless communication system according to one exemplary embodiment of the present invention.

FIG. 5 illustrates operations of the RS in the relay wireless communication system according to one exemplary embodiment of the present invention.

In step 501, the RS checks whether signals are received from the BS and the MS. That is, the RS determines whether both of the transmit symbol vector of the BS and the transmit symbol vector of the MS are received through two reception operations.

When receiving the signals from the BS and the MS, the RS determines the precoding matrix in step 503. That is, the RS determines the precoding matrix through the SVD operation on the channel matrix to the MS. The precoding matrix is the right singular matrix acquired through the SVD operation. In so doing, the RS needs to obtain the channel matrix information. When the duplex mode between the RS and the MS is the TDD, the RS acquires the channel matrix information by directly estimating the channel matrix. When the duplex mode is the FDD, the RS acquires the channel matrix information from the control information fed back from the MS.

In step 505, the RS transmits the precoding matrix information to the BS. For the effective channel matrix estimation of the BS, the RS transmits the control information including the precoding matrix information.

In step 507, the RS performs the XOR operation on the transmit symbol vector of the BS and the transmit symbol vector of the MS. Namely, the RS generates the transmit symbol vector for the relay.

In step 509, the RS precodes the transmit symbol vector for the relay using the precoding matrix. More specifically, the RS multiplies the transmit symbol vector for the relay by the precoding matrix. Next, the RS transmits the precoded transmit symbol vector to the BS and the MS at the same time.

In FIG. 5, the RS transmits the precoding matrix information for the effective channel matrix information acquisition of the BS in step 505. Alternatively, the RS can provide the effective channel information through an effective pilot. In this case, step 505 is replaced by a procedure for transmitting the effective pilot signal to the BS. Herein, the effective pilot signal indicates a pilot signal multiplied by the precoding matrix.

Figure 6:
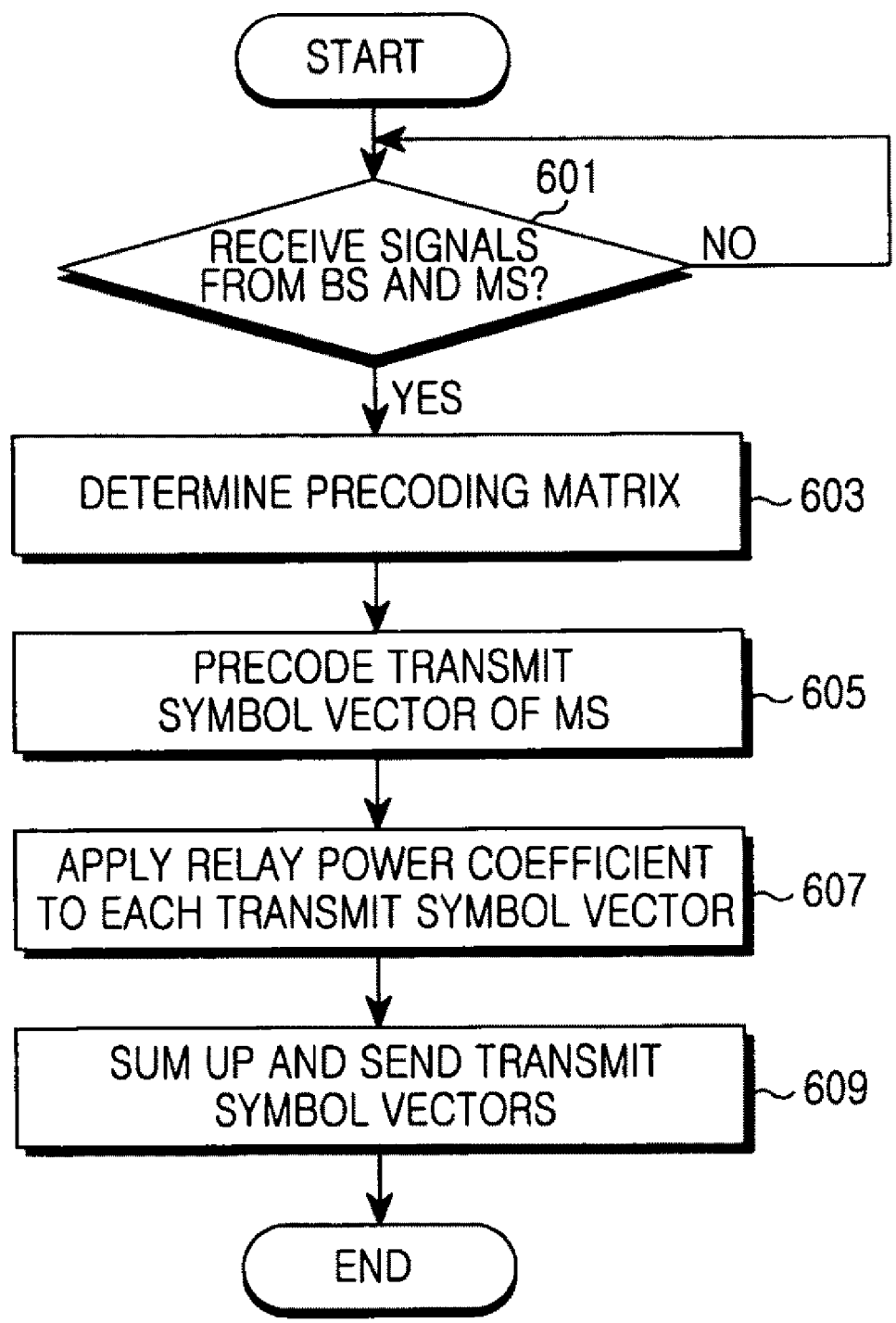
FIG. 6 illustrates operations of the relay station in the relay wireless communication system according to another exemplary embodiment of the present invention.

FIG. 6 illustrates operations of the RS in the relay wireless communication system according to another exemplary embodiment of the present invention.

In step 601, the RS checks whether signals are received from the BS and the MS. That is, the RS determines whether both of the transmit symbol vector of the BS and the transmit symbol vector of the MS are received through two reception operations.

When receiving the signals from the BS and the MS, the RS determines the precoding matrix in step 603. That is, the RS determines the precoding matrix through the SVD operation on the channel matrix to the MS. The precoding matrix is the right singular matrix acquired through the SVD operation. In so doing, the RS needs to obtain the channel matrix information. When the duplex mode between the RS and the MS is the TDD, the RS acquires the channel matrix information by directly estimating the channel matrix. When the duplex mode is the FDD, the RS acquires the channel matrix information from the control information fed back from the MS.

In step 605, the RS precodes the transmit symbol vector of the MS using the precoding matrix. That is, the RS multiplies the transmit symbol vector of the MS by the precoding matrix.

In step 607, the RS applies the relay power coefficients to the transmit symbol vector of the BS and the transmit symbol vector of the MS respectively. The relay power coefficients are the preset values, or the optimized value based on the transient channel variation. When the relay power coefficients are the optimized values based on the transient channel variation, the RS determines the relay power coefficients which make the rate to the BS and the rate to the MS the same. For example, the RS determines the estimation error values and the noise error values for every symbol vector based on Equation 9 and determines the detection success probability of the BS using the estimation error values and the noise error values based on Equation 36. The RS determines the equivalent noise power from the detection success probability based on Equation 41 and determines the singular values of the channel matrix between the RS and the MS through the SVD operation. Next, the RS substitutes the equivalent noise power and the singular values into Equation 43 and then determines the relay power coefficients which satisfy Equation 43.

In step 609, the RS generates the transmit symbol vector for the relay by summing the transmit symbol vector of the BS and the precoded transmit symbol vector of the MS with the relay power coefficients applied. The RS transmits the transmit symbol vector for the relay to the BS and the MS at the same time.

Figure 7:
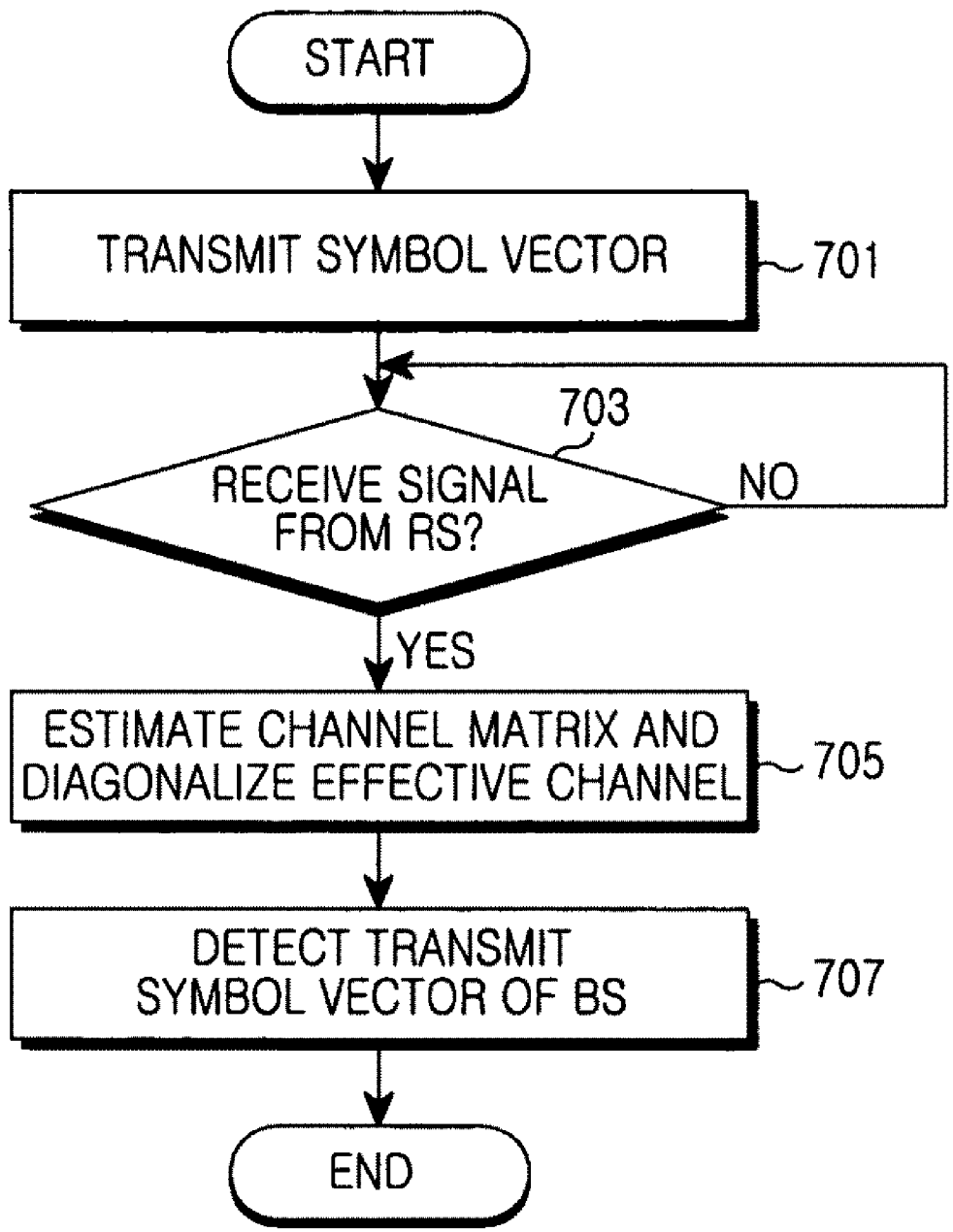
FIG. 7 illustrates operations of a mobile station in the relay wireless communication system according to an exemplary embodiment of the present invention.

FIG. 7 illustrates operations of the MS in the relay wireless communication system according to an exemplary embodiment of the present invention.

In step 701, the MS transmits the symbol vector to the RS. For the performance enhancement, the transmission scheme such as precoding, space-time coding, and beamforming can be used.

In step 703, the MS determines whether the signal is received from the RS. In one exemplary embodiment, the received signal from the RS is the product of the XOR operation result of the transmit symbol vector of the MS and the transmit symbol vector of the BS, and the precoding matrix. By contrast, in another exemplary embodiment, the received signal from the RS is the sum of the transmit symbol vector of the MS and the transmit symbol vector of the BS which are multiplied by the precoding matrix.

Upon receiving the signal, the MS estimates the channel matrix between the RS and the MS and diagonalizes the effective channel using the matrix channel in step 705. More specifically, the MS determines the left singular vector of the channel matrix through the SVD operation of the channel matrix, and then diagonalizes the effective channel by multiplying the Hermitian of the left singular vector by the received signal; that is, by the received symbol vector. Notably, in another exemplary embodiment, the MS subtracts the transmit symbol vector of the MS from the received symbol vector and then multiplies the left singular vector.

In step 707, the MS detects the transmit symbol vector of the BS. In one exemplary embodiment, the MS removes the diagonalized effective channel component and then detects the transmit symbol vector of the BS by applying the XOR operation to the transmit symbol vector of the MS. By contrast, in another exemplary embodiment, the MS detects the transmit symbol vector of the BS by removing the diagonalized effective channel component. The MS removes the diagonalized effective channel component using the ZF scheme or the MMSE scheme.

Figure 8:
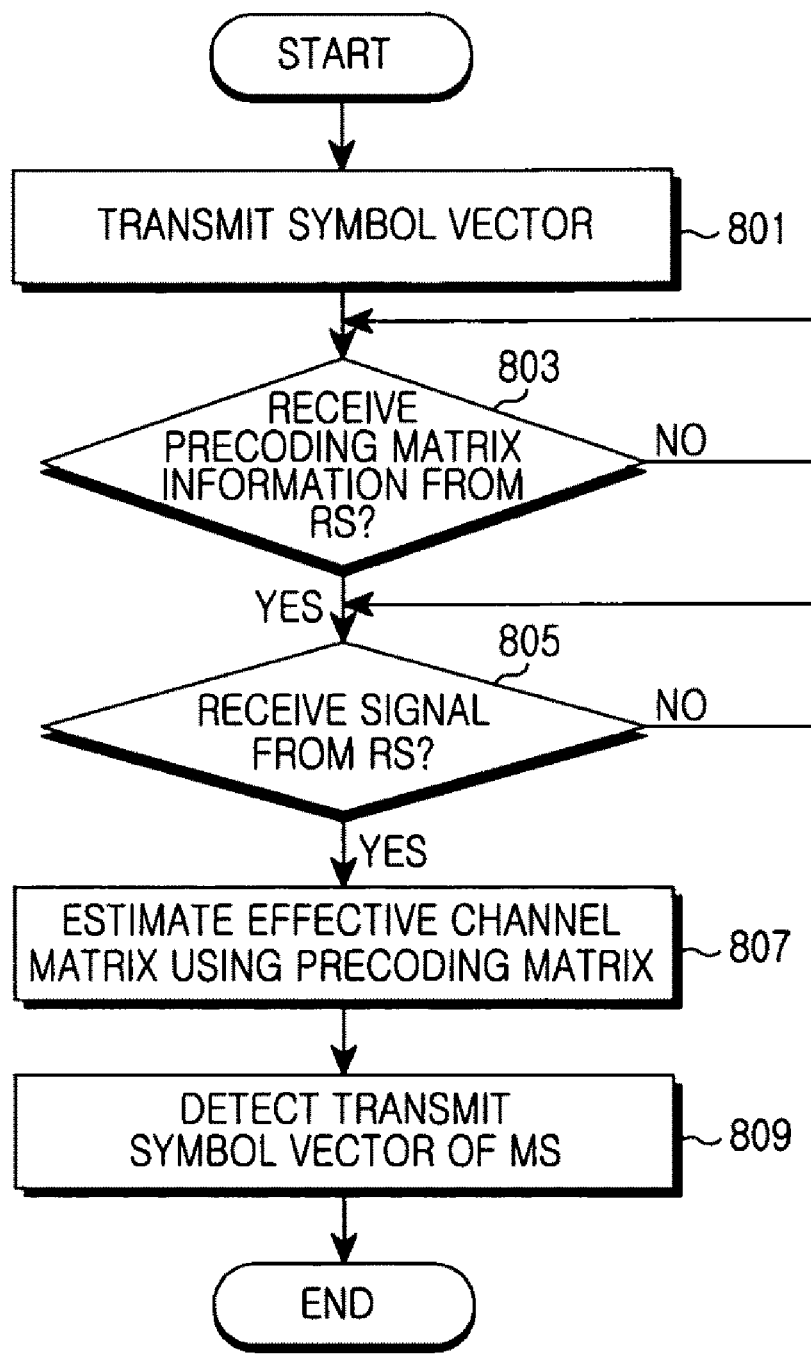
FIG. 8 illustrates operations of a base station in the relay wireless communication system according to one exemplary embodiment of the present invention.

FIG. 8 illustrates operations of the BS in the relay wireless communication system according to one exemplary embodiment of the present invention.

In step 801, the BS transmits the symbol vector to the RS. For the performance enhancement, the transmission scheme such as precoding, space-time coding, and beamforming can be employed.

In step 803, the BS determines whether the precoding matrix information is received from the RS. Herein, the precoding matrix information is the information indicating the precoding matrix, or the index indicating one of the matrixes in the codebook.

In step 805, the BS determines whether the signal is received from the RS. The received signal from the RS is the product of the XOR operation result of the transmit symbol vector of the MS and the transmit symbol vector of the BS and the precoding matrix.

Upon receiving the signal from the RS, in step 807, the BS estimates the effective channel matrix using the precoding matrix confirmed from the information received in step 803. In other words, the BS estimates the channel matrix between the RS and the BS, and determines the product of the precoding matrix and the channel matrix.

In step 809, the BS detects the transmit symbol vector of the MS. More specifically, the BS detects the XOR operation result of the transmit symbol vector of the MS and the transmit symbol vector of the BS from the signal received in step 805 using the effective channel matrix, and detects the transmit symbol vector of the MS by performing the XOR operation on the XOR operation result and the transmit symbol vector of the BS.

In FIG. 8, the BS obtains the effective channel matrix information by use of the precoding matrix forwarded from the RS. Alternatively, the BS can attain the effective channel information through the effective pilot. In this case, step 803 is omitted and step 807 is replaced by a procedure for estimating the effective channel matrix using the effective pilot signal received from the RS. Herein, the effective pilot signal indicates the pilot signal multiplied by the precoding matrix.

Figure 9:
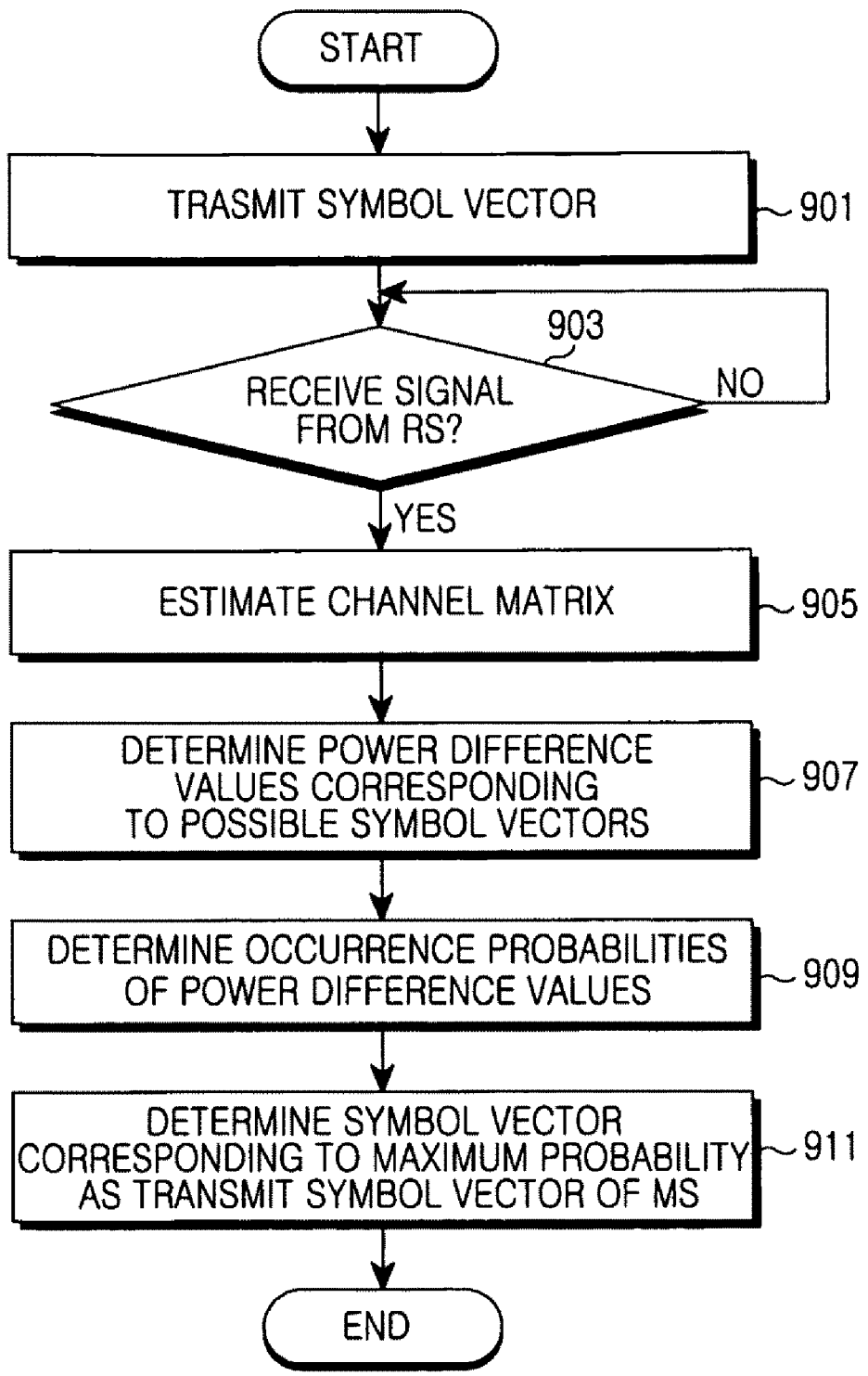
FIG. 9 illustrates operations of the base station using a Maximum Likelihood (ML) scheme in the relay wireless communication system according to another exemplary embodiment of the present invention.

FIG. 9 illustrates operations of the BS using the ML scheme in the relay wireless communication system according to another exemplary embodiment of the present invention.

In step 901, the BS transmits the symbol vector to the RS. For the performance enhancement, the transmission scheme such as precoding, space-time coding, and beamforming can be employed.

In step 903, the BS determines whether the signal is received from the RS. The received signal from the RS is the sum of the transmit symbol vector of the MS and the transmit symbol vector of the BS which are multiplied by the precoding matrix.

Upon receiving the signal from the RS, the BS estimates the channel matrix between the RS and the BS in step 905. That is, the BS estimates the channel matrix of N (=the number of the RS transmit antennas)×N (=the number of the BS receive antennas) size using the pilot signal.

In step 907, the BS determines the power difference values corresponding to the respective possible symbol vectors. Herein, the possible symbol vectors indicate symbol vectors available as the transmit symbol vector of the MS. More specifically, the BS constitutes every symbol vector available as the transmit symbol vector of the MS, determines the power value of the received signal excluding the components of the symbol vectors, and then subtracts the power value of the transmit symbol vector of the BS. For example, the BS determines the power values of the received signal excluding the components of the transmit symbol vectors of the MS based on Equation 7, and computes the power difference values based on Equation 8. Thus, the BS obtains the power difference values as many as the number of the possible symbol vectors.

In step 909, the BS determines the occurrence probability of each power difference value. The BS determines the matrix B of Equation 14 using the channel matrix and acquires variables needed for the computation of Equation 15 through the SVD operation on the matrix B. The BS computes $\alpha$ and $\beta$ for the calculation of Equation 17 by substituting the variables and the power difference values into Equation 15, and then determines the occurrence probabilities of the power difference values based on Equation 17.

In step 911, the BS compares the occurrence probabilities of the power difference values and determines the symbol vector corresponding to the power difference value of the maximum occurrence probability as the transmit symbol vector of the MS. Namely, the BS determines the transmit symbol vector of the MS based on Equation 19.

Figure 10:
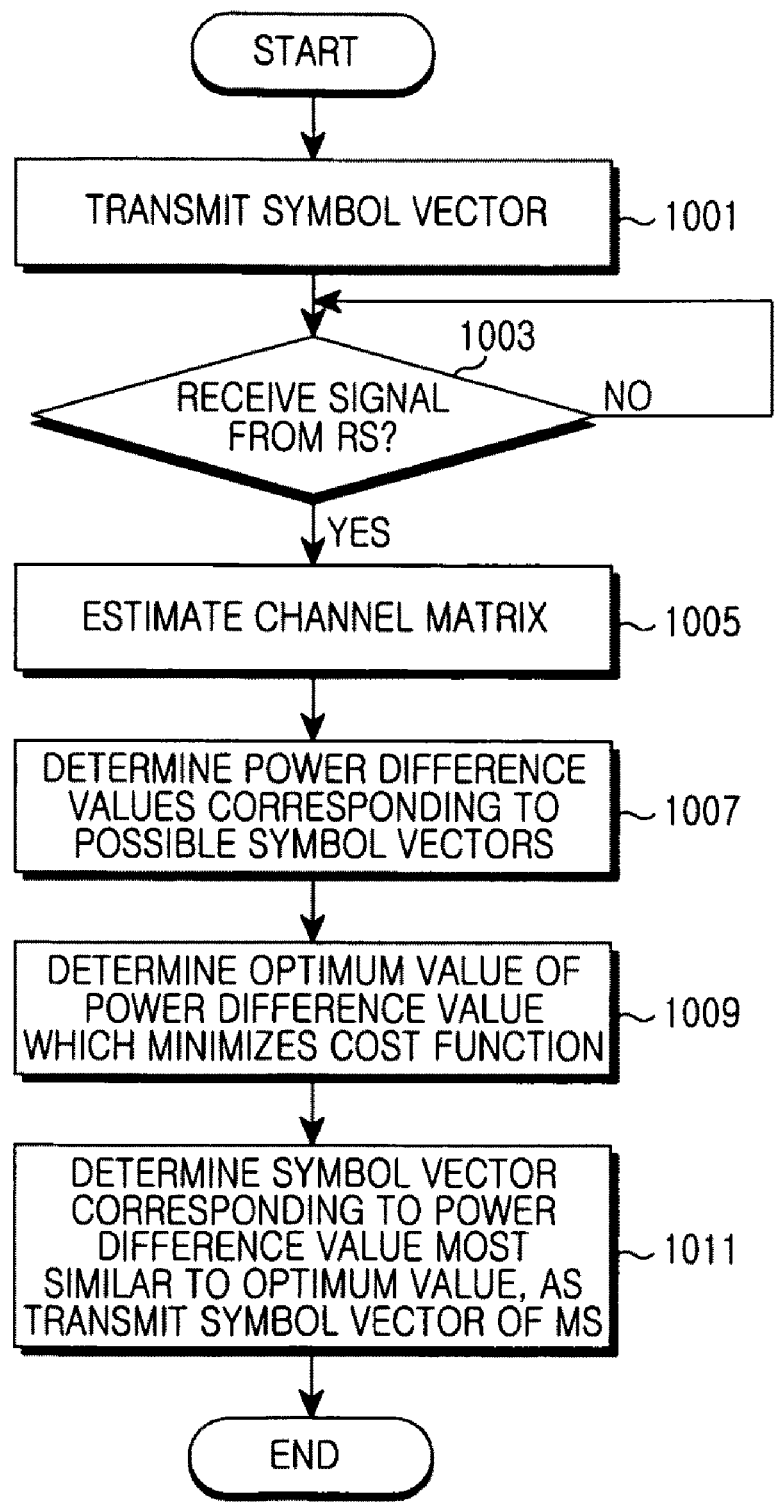
FIG. 10 illustrates operations of the base station using a Least Square (LS) scheme in the relay wireless communication system according to another exemplary embodiment of the present invention.

FIG. 10 illustrates operations of the BS using the LS scheme in the relay wireless communication system according to another exemplary embodiment of the present invention.

In step 1001, the BS transmits the symbol vector to the RS. For the performance enhancement, the transmission scheme such as precoding, space-time coding, and beamforming can be employed.

In step 1003, the BS checks whether the signal is received from the RS. The received signal from the RS is the sum of the transmit symbol vector of the MS and the transmit symbol vector of the BS which are multiplied by the precoding matrix.

Upon receiving the signal from the RS, the BS estimates the channel matrix between the RS and the BS in step 1005. That is, the BS estimates the channel matrix of N (=the number of the RS transmit antennas)×N (=the number of the BS receive antennas) size using the pilot signal.

In step 1007, the BS determines the power difference values corresponding to the respective possible symbol vectors. Herein, the possible symbol vectors indicate symbol vectors available as the transmit symbol vector of the MS. More specifically, the BS constitutes every symbol vector available as the transmit symbol vector of the MS, determines the power value of the received signal excluding the components of the symbol vectors, and then subtracts the power value of the transmit symbol vector of the BS. For example, the BS determines the power values of the received signal excluding the components of the transmit symbol vectors of the MS based on Equation 7, and computes the power difference values based on Equation 8. Thus, the BS obtains the power difference values as many as the number of the possible symbol vectors.

In step 1009, the BS determines an optimum value of the power difference value which minimizes the cost function. More specifically, to acquire the optimum value of the power difference value which minimizes the cost function, the BS multiplies the sum of the diagonal components of the product of the inverse of the channel matrix and the Hermitian of the inverse of the channel matrix, by the noise power. Namely, the BS determines the optimum value based on Equation 22. Herein, the cost function indicates the result after subtracting the product of the transmit signal of the BS, the precoding matrix, and the noise vector, and the noise power from the power difference value. For example, the cost function is defined as Equation 20.

In step 1011, the BS compares the power difference values with the optimum value, and determines the symbol vector corresponding to the power difference value most similar to the optimum value, as the transmit symbol vector of the MS.

Figure 11:
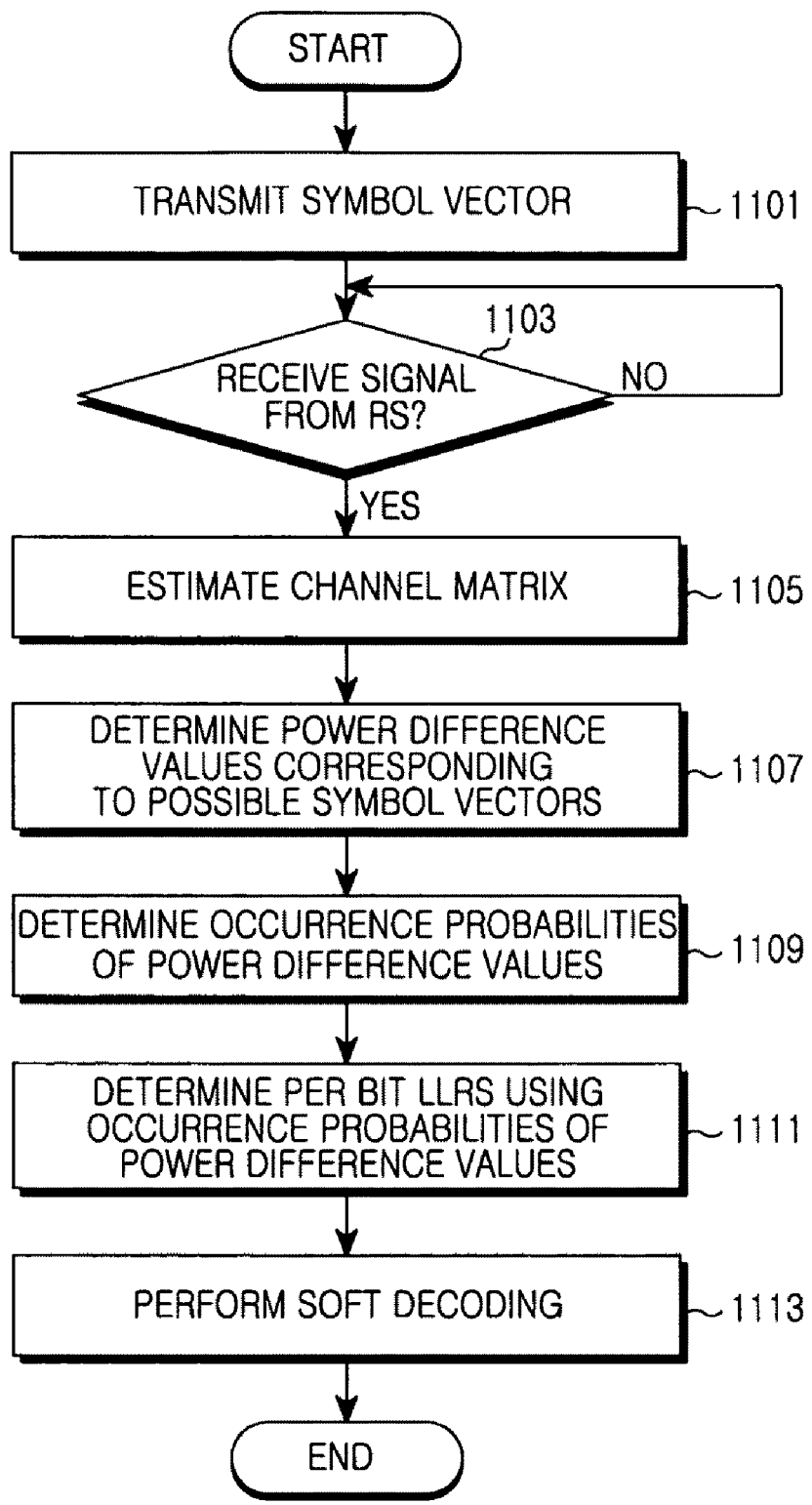
FIG. 11 illustrates operations of the base station using a Log Likelihood Ratio (LLR) scheme in the relay wireless communication system according to another exemplary embodiment of the present invention.

FIG. 11 illustrates operations of the BS using the LLR scheme in the relay wireless communication system according to another exemplary embodiment of the present invention.

In step 1101, the BS transmits the symbol vector to the RS. For the performance enhancement, the transmission scheme such as precoding, space-time coding, and beamforming can be employed.

In step 1103, the BS checks whether the signal is received from the RS. The received signal from the RS is the sum of the transmit symbol vector of the MS and the transmit symbol vector of the BS which are multiplied by the precoding matrix.

Upon receiving the signal from the RS, the BS estimates the channel matrix between the RS and the BS in step 1105. That is, the BS estimates the channel matrix of N (=the number of the RS transmit antennas)×N (=the number of the BS receive antennas) size using the pilot signal.

In step 1107, the BS determines the power difference values corresponding to the respective possible symbol vectors. Herein, the possible symbol vectors indicate symbol vectors available as the transmit symbol vector of the MS. More specifically, the BS constitutes every symbol vector available as the transmit symbol vector of the MS, determines the power value of the received signal excluding the components of the symbol vectors, and then subtracts the power value of the transmit symbol vector of the BS. For example, the BS determines the power values of the received signal excluding the components of the transmit symbol vectors of the MS based on Equation 7, and computes the power difference values based on Equation 8. Thus, the BS obtains the power difference values as many as the number of the possible symbol vectors.

In step 1109, the BS determines the occurrence probabilities of the power difference values respectively. The BS determines the matrix B of Equation 14 using the channel matrix, and acquires the variables needed for the computation of Equation 15 through the SVD operation on the matrix B. The BS computes $\alpha$ and $\beta$ for the calculation of Equation 17 by substituting the variables and the power difference values into Equation 15, and then determines the occurrence probabilities of the power difference values based on Equation 17.

In step 1111, the BS determines the per bit LLRs using the occurrence probabilities of the power difference values. By determining the ratio of the sum of the occurrence probabilities of the power difference values acquired from the symbol vectors when the bit value is '1' to the sum of the occurrence probabilities of the power difference values acquired from the symbol vectors when the bit value is zero with respect to every bit, the BS computes the per bit LLRs. For example, to calculate the LLR of the first bit, the BS classifies the symbol vectors of the first bit '1' and the symbol vectors of the first bit '0'. The BS sums up the occurrence probabilities of the power difference values acquired from the symbol vectors of the first bit '1' and sums up the occurrence probabilities of the power difference values acquired from the symbol vectors of the first bit '0'. Next, the BS determines the ratio of the two sums and thus determines the LLR of the first bit. For example, the BS computes the sums of the occurrence probabilities with respect to the bit values '0' and '1' based on Equation 26 and Equation 27, and computes the LLR based on Equation 23.

In step 1113, the BS performs the soft decoding using the LLRs. For example, the BS can adopt a Maximum A Posteriori (MAP) decoding scheme and Viterbi decoding scheme. Using the Viterbi decoding scheme, the BS needs to determine the receive value of the signal. For doing so, the BS uses the equivalent received signal defined as the sum of the signal and the equivalent noise as expressed in Equation 28. The equivalent received signal is determined using the per bit LLRs and the equivalent noise power. For example, the equivalent received signal is acquired based on Equation 30.

In FIG. 11, the detection process using the LLR has been described. Alternatively, the detection performance can be enhanced by additionally applying the SIC scheme to the operations of the BS in FIG. 11. More specifically, the BS determines the signal detection order on the antenna basis, detects the transmit symbol according to that order, removes the interference component caused by the symbol detected from the received signal, and detects the next transmit symbol from the interference-rejected receive signal. The detection is carried out in the order for minimizing the variance of the effective noise in each phase. The effective noise is defined as the noise error value of the power difference value. Among the columns of the channel matrix used to calculate the noise error value, the column corresponding to the antenna which is the detection target in the previous phase is substituted by the '0' vector. That is, the BS detects the signal of the antenna corresponding to the column which minimizes the variance of the noise error value after the substitution by the '0' vector in each repetition phase. Next, the BS cancels the interference caused by the detected signal based on Equation 30 and substitutes the column corresponding to the antenna which is the detection target in the channel matrix with the '0' vector.

Figure 12:
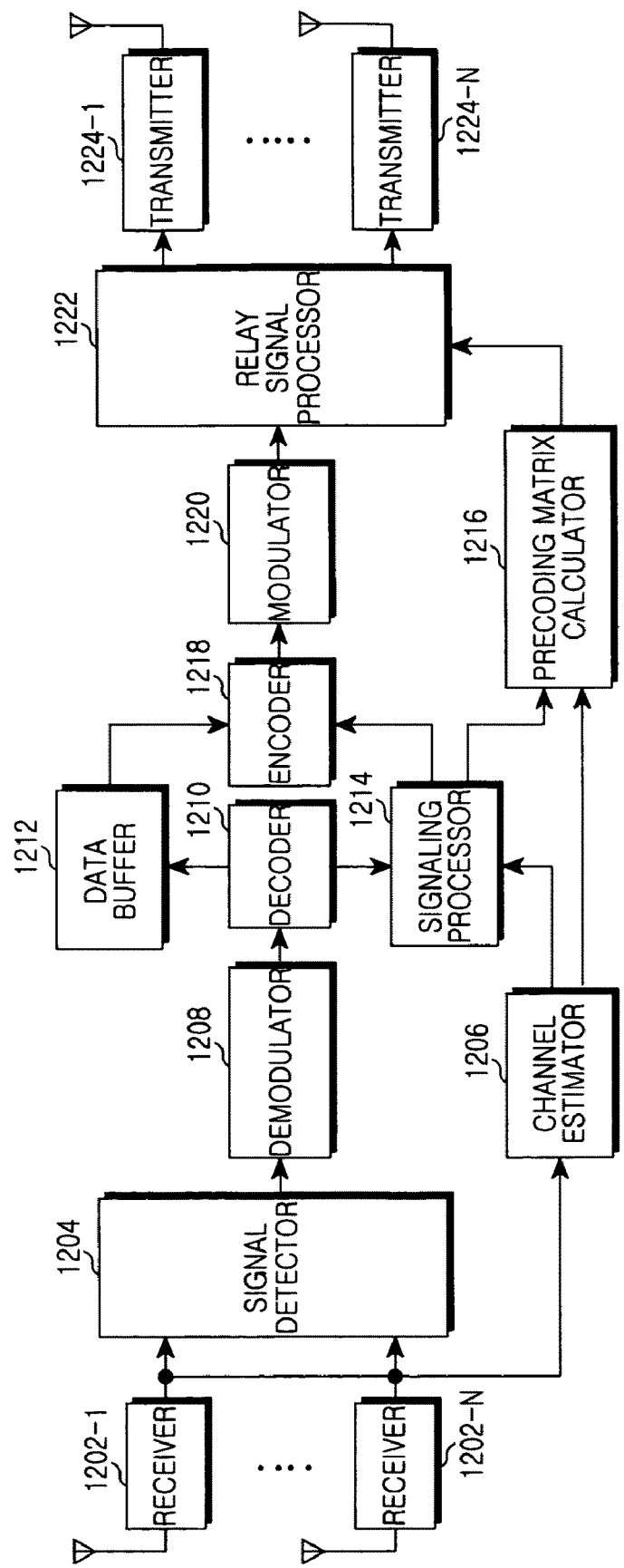
FIG. 12 illustrates the relay station in the relay wireless communication system according to an exemplary embodiment of the present invention.

FIG. 12 illustrates the RS in the relay wireless communication system according to an exemplary embodiment of the present invention.

The RS of FIG. 12 includes a plurality of receivers 1202-1 through 1202-N, a signal detector 1204, a channel estimator 1206, a demodulator 1208, a decoder 1210, a data buffer 1212, a signaling processor 1214, a precoding matrix calculator 1216, an encoder 1218, a modulator 1220, a relay signal processor 1222, and a plurality of transmitters 1224-1 through 1224-N.

The receivers 1202-1 through 1202-N convert Radio Frequency (RF) signals received via respective antennas, to baseband signals. The signal detector 1204 detects the per stream signals according to a multi-antenna detection scheme. The channel estimator 1206 estimates the channel matrix with the transmitting end; that is, with the BS or the MS using the pilot signal of the baseband signals. The demodulator 1208 demodulates the baseband signals to the encoded bit stream. The decoder 1210 decodes the encoded bit stream to information bit stream. The decoder 1210 outputs the data bit stream to the data buffer 1212 and outputs the control message bit stream to the signaling processor 1214.

The data buffer 1212 temporarily stores the data received from the transmitting end, and outputs the stored data to the encoder 1218 in the data transmission. The signaling processor 1214 confirms the information in the control message by analyzing the control message received from the transmitting end, and generates a control message to transmit to the receiving end. In particular, when the duplexing with the MS confirms to the FDD scheme, the signaling processor 1214 analyzes the message including downlink channel matrix information of the MS and provides the downlink channel matrix information of the MS to the precoding matrix calculator 1216. In one exemplary embodiment, the signaling processor 1214 receives the precoding matrix information from the precoding matrix calculator 1216, and generates a control message including the precoding matrix information to provide the precoding matrix information to the BS. The precoding matrix calculator 1216 determines the precoding matrix for the signal relay. The precoding matrix calculator 1216 performs the SVD operation on the downlink channel matrix of the MS and determines the right singular matrix acquired through the SVD operation as the precoding matrix. The precoding matrix calculator 1216 provides the precoding matrix to the relay signal processor 1222.

The encoder 1218 encodes the information bit streams output from the data buffer 1212 and the signaling processor 1214. The modulator 1220 modulates the encoded bit stream to the symbols. The relay signal processor 1222 processes the transmit symbol vector of the BS and the transmit symbol vector of the MS for the three-phase bidirectional relay. In one exemplary embodiment, the relay signal processor 1222 performs the XOR operation on the transmit symbol vector of the BS and the transmit symbol vector of the MS, and precodes using the precoding matrix. In another exemplary embodiment, the relay signal processor 1222 determines the relay power coefficient for the BS and the relay power coefficient for the MS, precodes the transmit symbol vector of the MS using the precoding matrix, applies the relay power coefficient to the transmit symbol vectors, and sums up the transmit symbol vectors applied with the relay power coefficient.

The relay power coefficients are the preset values, or the optimized values based on the transient channel variation. When the relay power coefficients use the optimized values based on the transient channel variation, the relay signal processor 1222 determines the relay power coefficients which make the rate to the BS and the rate to the MS the same. For example, the relay signal processor 1222 determines the estimation error values and the noise error values with respect to every possible symbol vector based on Equation 9, and determines the detection success probability of the BS using the estimation error values and the noise error values based on Equation 36. The relay signal processor 1222 determines the equivalent noise power from the detection success probability based on Equation 41 and determines the singular values of the channel matrix between the RS and the MS through the SVD operation. Next, the relay signal processor 1222 substitutes the equivalent noise power and the singular values into Equation 43, and then determines the relay power coefficients meeting Equation 43. The transmitters 1224-1 through 1224-N convert the baseband signals of the streams output from the relay signal processor 1222 to RF signals and transmit the RF signals via transmit antennas.

Figure 13:
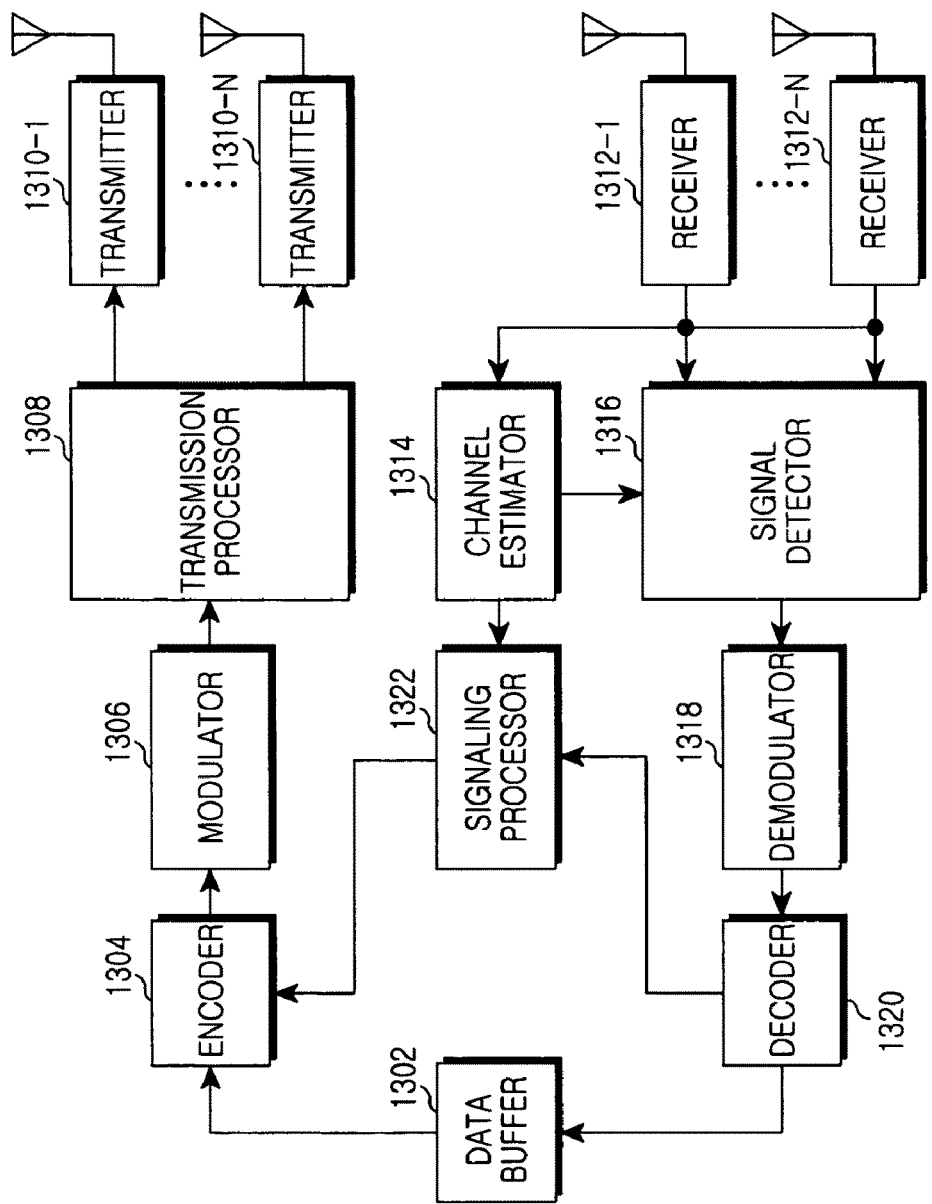
FIG. 13 illustrates the mobile station in the relay wireless communication system according to an exemplary embodiment of the present invention.

FIG. 13 illustrates the MS in the relay wireless communication system according to an exemplary embodiment of the present invention.

The MS of FIG. 13 includes a data buffer 1302, an encoder 1304, a modulator 1306, a transmission processor 1308, a plurality of transmitters 1310-1 through 1310-N, a plurality of receivers 1312-1 through 1312-N, a channel estimator 1314, a signal detector 1316, a demodulator 1318, a decoder 1320, and a signaling processor 1322.

The data buffer 1302 temporarily stores data to transmit and data received, and outputs the stored data to the encoder 1304 in the data transmission. The encoder 1304 encodes information bit streams output from the data buffer 1302 and the signaling processor 1322. The modulator 1306 modulates the encoded bit stream to the symbols. The transmission processor 1308 constitutes a plurality of streams with the symbols output from the modulator 1306 according to the multi-antenna transmission scheme. The transmitters 1310-1 through 1310-N convert the baseband signals of the streams to RF signals and transmit the RF signals via transmit antennas respectively.

The receivers 1312-1 through 1312-N convert RF signals received via antennas to baseband signals. The channel estimator 1314 estimates the channel matrix with the RS using the pilot signal of the baseband signals. The signal detector 1316 detects per stream signals according to the multi-antenna detection scheme. In particular, the signal detector 1316 determines the coupling vector corresponding to the precoding matrix using the channel matrix output from the channel estimator 1314, and detects the transmit symbol vector of the BS using the coupling matrix. The signal detector 1316 diagonalizes the effective channel matrix by multiplying the received signal by the coupling matrix. The signal detector 1316 performs the SVD operation on the channel matrix and determines the Hermitian of the left singular matrix acquired through the SVD operation as the coupling matrix. In one exemplary embodiment, the signal detector 1316 detects the transmit symbol vector of the BS by performing the XOR operation on the received signal multiplied by the coupling matrix and the transmit symbol vector of the MS. By contrast, in another exemplary embodiment, the signal detector 1316 detects the transmit symbol vector of the BS by removing the diagonalized effective channel component. The signal detector 1316 eliminates the diagonalized effective channel component using the ZF scheme or the MMSE scheme.

The demodulator 1318 demodulates the baseband signals to the encoded bit stream. The decoder 1320 decodes the encoded bit stream to information bit stream. The decoder 1320 outputs the data bit stream to the data buffer 1302 and outputs the control message bit stream to the signaling processor 1322. The signaling processor 1322 confirms information in the control message by analyzing the control message received from the RS or the BS, and generates a control message to transmit to the RS or the BS. When the duplexing with the RS conforms to the FDD scheme, the signaling processor 1322 generates a message including the channel matrix information.

Figure 14:
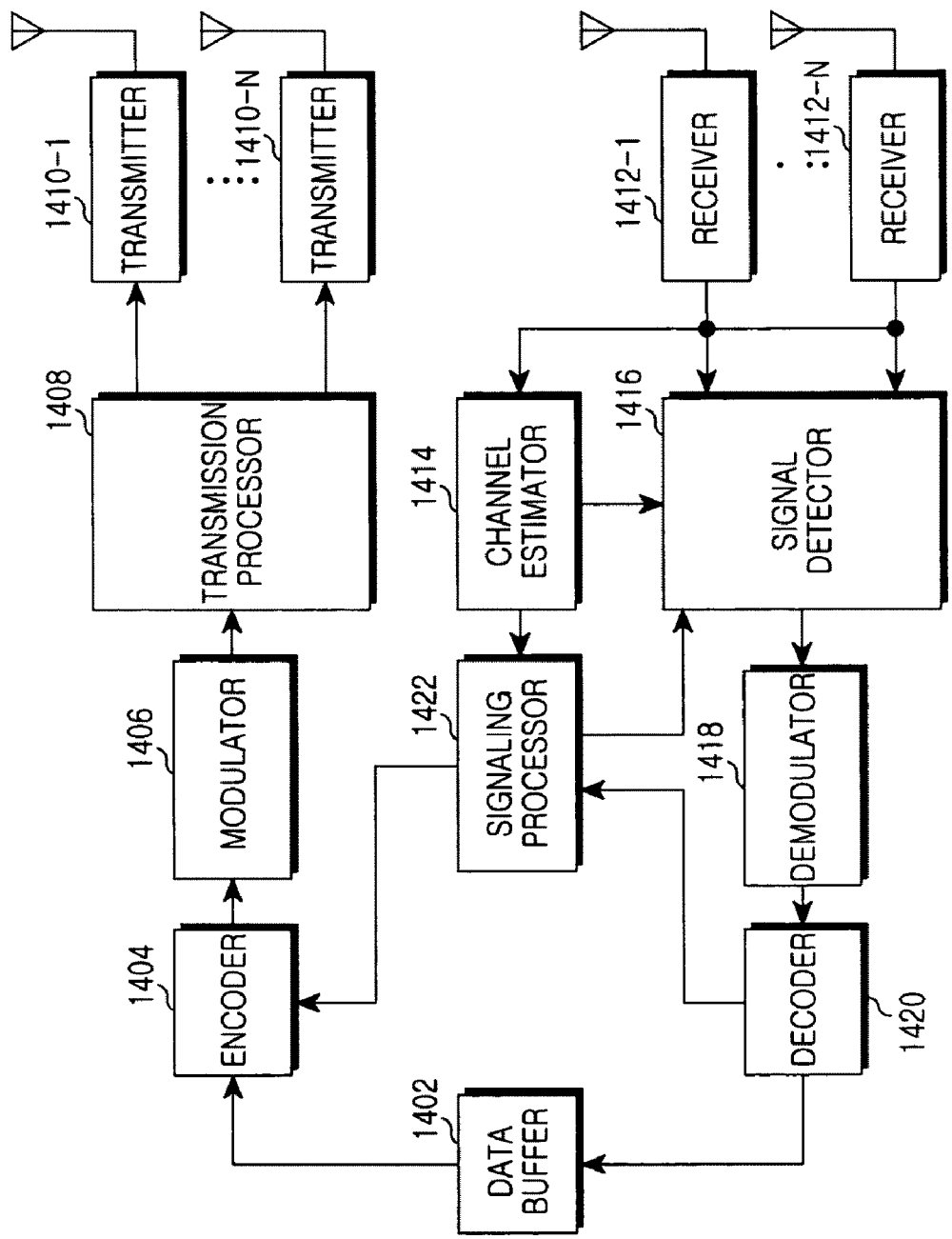
FIG. 14 illustrates the base station in the relay wireless communication system according to an exemplary embodiment of the present invention.

FIG. 14 illustrates the BS in the relay wireless communication system according to an exemplary embodiment of the present invention.

The BS of FIG. 14 includes a data buffer 1402, an encoder 1404, a modulator 1406, a transmission processor 1408, a plurality of transmitters 1410-1 through 1410-N, a plurality of receivers 1412-1 through 1412-N, a channel estimator 1414, a signal detector 1416, a demodulator 1418, a decoder 1420, and a signaling processor 1422.

The data buffer 1402 temporarily stores data to transmit and data received, and outputs the stored data to the encoder 1404 in the data transmission. The encoder 1404 encodes information bit streams output from the data buffer 1402 and the signaling processor 1422. The modulator 1406 modulates the encoded bit stream to the symbols. The transmission processor 1408 constitutes a plurality of streams with the symbols output from the modulator 1406 according to the multi-antenna transmission scheme. The transmitters 1410-1 through 1410-N convert the baseband signals of the streams to RF signals and transmit the RF signals via transmit antennas respectively.

The receivers 1412-1 through 1412-N convert RF signals received via antennas to baseband signals. The channel estimator 1414 estimates the channel matrix with the RS using the pilot signal of the baseband signals. The signal detector 1416 detects per stream signals according to the multi-antenna detection scheme. In one exemplary embodiment, the signal detector 1416 estimates the effective channel matrix using the precoding matrix information output from the signaling processor 1422, and detects the transmit symbol vector from the MS. The signal detector 1416 determines the effective channel matrix by multiplying the channel matrix output from the channel estimator 1414 by the precoding matrix, detects the XOR operation result of the transmit symbol vector of the MS and the transmit symbol vector of the BS from the received signal using the effective channel matrix, and performs the XOR operation on the XOR operation result and the transmit symbol vector of the BS, to thus detect the transmit symbol vector of the MS.

In another exemplary embodiment, the signal detector 1416 detects the transmit symbol vectors of the MS according to the ML scheme or the LS scheme, or determines the per bit LLRs. In conformity with the ML scheme, the signal detector 1416 determines the power difference values corresponding to the possible symbol vectors. Herein, the possible symbol vectors are the symbol vectors available as the transmit symbol vector of the MS. That is, the signal detector 1416 constitutes all of the symbol vectors available as the transmit symbol vector of the MS, determines the power value of the received signal excluding the components of the symbol vectors, and subtracts the power value of the transmit symbol vector of the BS. For example, the signal detector 1416 computes the power values of the received signal excluding the components of the transmit symbol vectors of the MS based on Equation 7, and computes the power difference values based on Equation 8. Next, the signal detector 1416 determines the occurrence probabilities of the power difference values respectively. More particularly, the signal detector 1416 determines the matrix B of Equation 14 using the channel matrix, and acquires the variables needed for the calculation of Equation 15 through the SVD operation on the matrix B. The signal detector 1416 computes $\alpha$ and $\beta$ for the calculation of Equation 17 by substituting the variables and the power difference values into Equation 15, and then determines the occurrence probabilities of the power difference values based on Equation 17. Next, the signal detector 1416 compares the occurrence probabilities of the power difference values and determines the symbol vector corresponding to the power difference value of the maximum occurrence probability as the transmit symbol vector of the MS. That is, the signal detector 1416 determines the transmit symbol vector of the MS based on Equation 19.

In conformity with the LS scheme, the signal detector 1416 determines the power difference values corresponding to the possible symbol vectors in the same manner as in the ML scheme, and determines the optimum value of the power difference value which minimizes the cost function. More specifically, to acquire the optimum value of the power difference value which minimizes the cost function, the signal detector 1416 multiplies the sum of the diagonal components of the product of the inverse of the channel matrix and the Hermitian of the inverse of the channel matrix, by the noise power based on Equation 22. For example, the cost function is defined as Equation 20. The signal detector 1416 compares the power difference values with the optimum value and determines the symbol vector corresponding to the power difference value most similar to the optimum value as the transmit symbol vector of the MS.

To calculate the LLR, the signal detector 1416 computes the power difference values corresponding to the possible symbol vectors and the occurrence probabilities of the power difference values in the same manner as in the ML scheme. Next, the signal detector 1416 determines the per bit LLRs using the occurrence probabilities of the power difference values. That is, the signal detector 1416 determines the per bit LLRs by computing the ratio of the sum of the occurrence probabilities of the power difference values acquired from the symbol vectors when the bit value is '1' to the sum of the occurrence probabilities of the power difference values acquired from the symbol vectors when the bit value is zero with respect to every bit. For example, the signal detector 1416 computes the sums of the occurrence probabilities with respect to the bit values '0' and '1' based on Equation 26 and Equation 27, and determines the LLR based on Equation 23. Upon acquiring the LLRs, the signal detector 1416 outputs the LLRs to the decoder 1420.

The demodulator 1418 demodulates the baseband signals to the encoded bit stream. The decoder 1420 decodes the encoded bit stream to information bit stream. The decoder 1420 outputs the data bit stream to the data buffer 1402 and outputs the control message bit stream to the signaling processor 1422. When receiving the per bit LLRs from the signal detector 1416, the decoder 1420 performs the soft decoding using the LLRs. For example, the decoder 1420 can employ the MAP decoding scheme, the Viterbi decoding scheme, and so on. As using the Viterbi decoding scheme, the decoder 1420 needs to determine the receive value of the signal. For doing so, the decoder 1420 uses the equivalent received signal defined as the sum of the signal and the equivalent noise based on Equation 28. The equivalent received signal is obtained using the per bit LLRs and the equivalent noise power. For example, the equivalent received signal is given by Equation 30. The signaling processor 1422 confirms information in the control message by analyzing the control message received from the RS or the MS, and generates a control message to transmit to the RS or the MS. In one exemplary embodiment, the signaling processor 1422 confirms the message including the precoding matrix information and provides the precoding matrix information to the signal detector 1416.

In FIG. 14, the structure of the BS for determining the LLR has been explained. Alternatively, the detection performance can be improved by adding a function of the SIC scheme to the LLR calculation structure. In further detail, the signal detector 1416 determines the signal detection order on the antenna basis, detects the transmit symbol in that order, removes the interference component caused by the detected symbol in the received signal, and detects the next transmit symbol from the interference-rejected receive signal. The detection is carried out in the order for minimizing the variance of the effective noise in each repetition phase. The effective noise is defined as the noise error value of the power difference value. Among the columns of the channel matrix used to calculate the noise error value, the column corresponding to the antenna which is the detection target in the previous phase, is substituted by the 0 vector. In other words, the signal detector 1416 detects the signal of the antenna corresponding to the column which minimizes the variance of the noise error value after the substitution by the '0' vector in the respective repetition phases. The signal detector 1416 cancels the interference caused by the detected signal based on Equation 30 and substitutes the column corresponding to the antenna which is the detection target in the channel matrix, by the '0' vector.

Figure 15A:
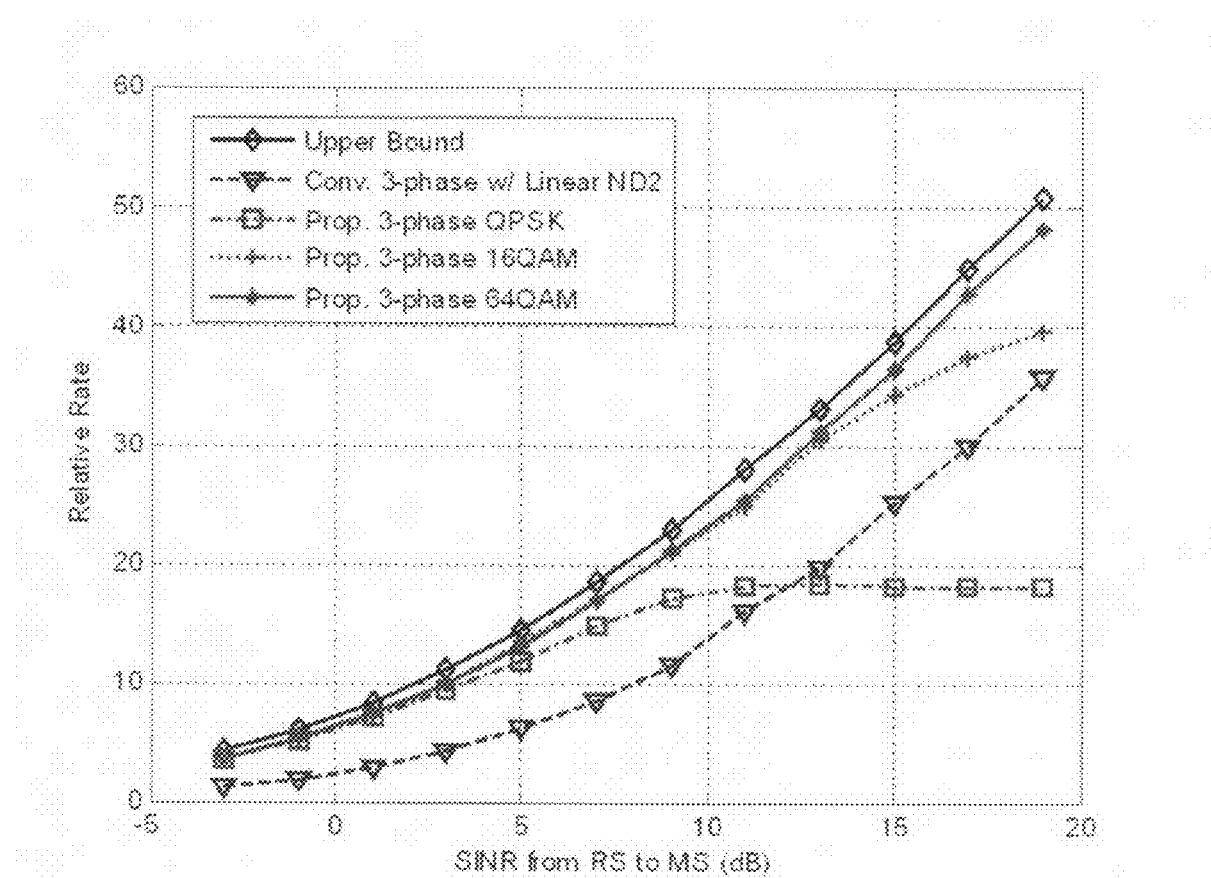
FIGS. 15A, 15B and 15C illustrate performance of the system according to an exemplary embodiment of the present invention.
Figure 15B:
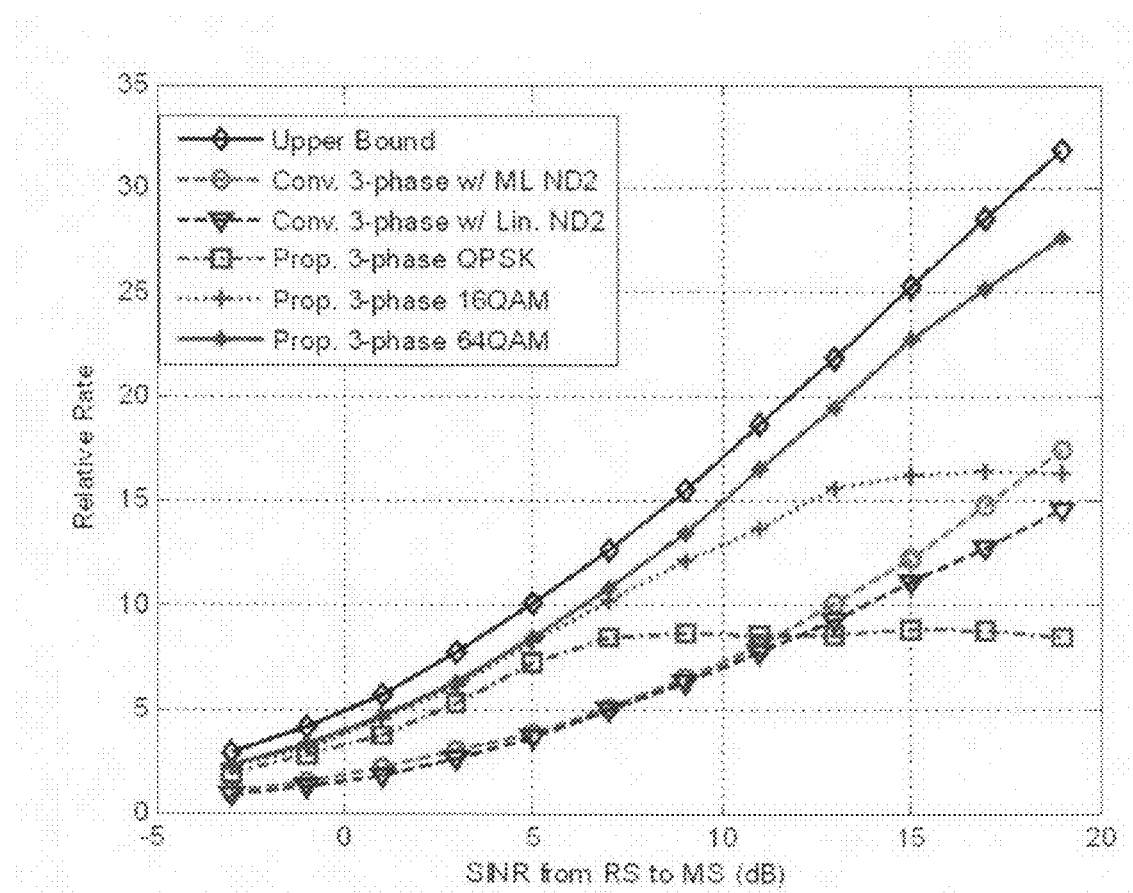
Figure 15C:
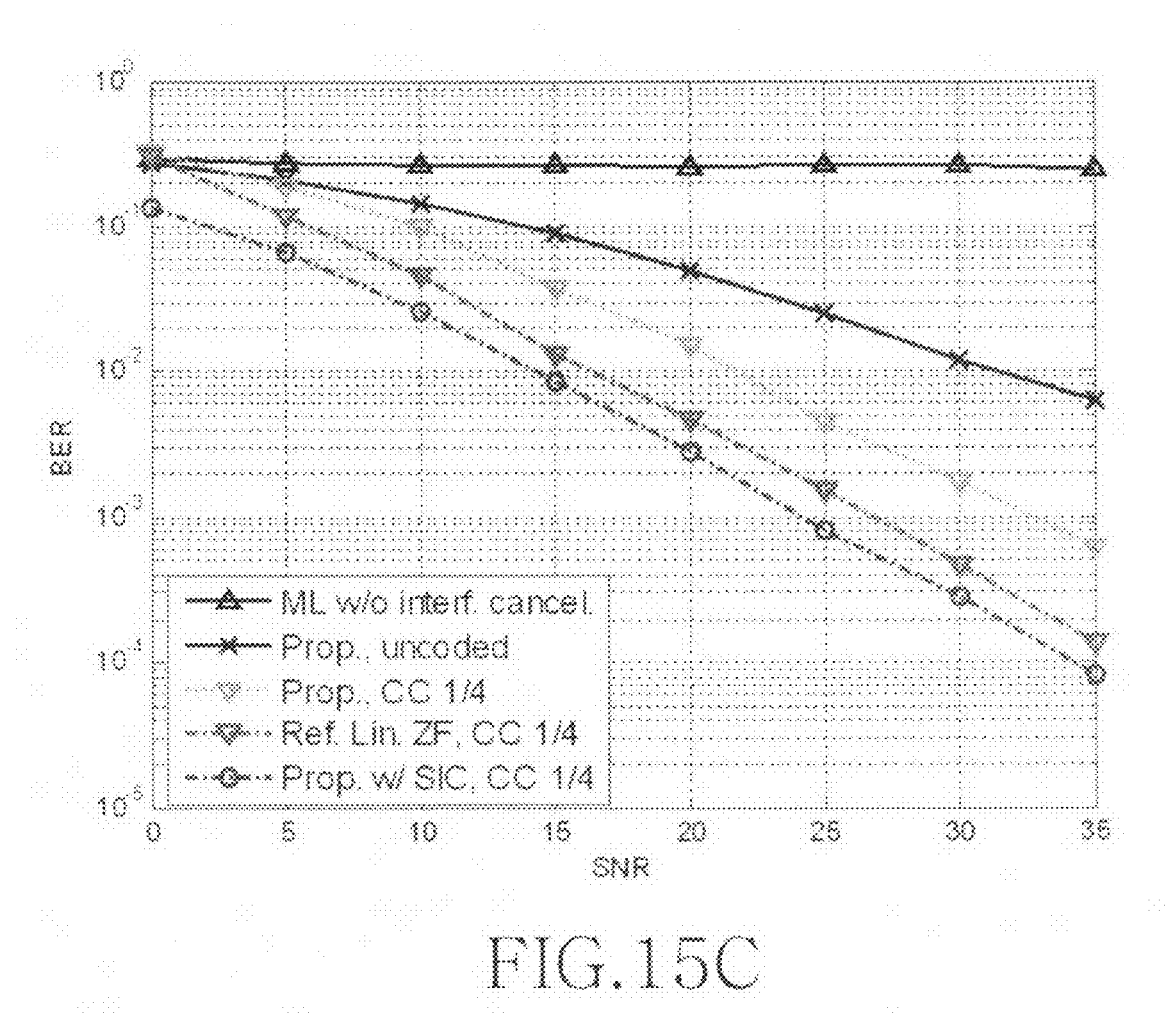

FIGS. 15A, 15B and 15C show the performance of the system according to an exemplary embodiment of the present invention. The graphs in FIGS. 15A, 15B and 15C are simulation results of the system according to an exemplary embodiment of the present invention. The simulation assumes a Rayleigh fading channel and the average Signal to Noise Ratio (SNR) 30 dB of the RS and the BS.

FIG. 15A depicts the achievable rate in the 4×4×4 system. The performance when the MS employs a MMSE equalizer in a conventional Network Coding (NC) relaying scheme is colored blue, and one exemplary embodiment of the present invention is indicated by the black line. Without respect to the feed forward resource loss, the system according to one exemplary embodiment of the present invention reaches the capacity of the system. Another exemplary embodiment of the present invention without the feed forward information is red-colored based on the various modulation schemes. Another exemplary embodiment of the present invention even without additional feed forward resource reaches the upper bound which is the performance of one exemplary embodiment. By use of the addition, even higher gain can be expected with the higher layer technique.

FIG. 15B depicts the achievable rate in the 2×8×2 system. As the number of the antennas of the RS increases, the precoding for the diversity gain can be used in the last phase. The conventional technique, which does not use the precoding, exhibits the lower performance than the other techniques. The conventional technique cannot overcome this performance gap even with the ML scheme applied at the MS. The exemplary embodiments of the present invention obtain the full diversity gain of the poorer channel using the linear precoding and exhibit the superior performance to the conventional techniques.

FIG. 15C shows a Bit Error Rate (BER) curve in the 2×2×2 system. To represent the comparison target, the performance of the linear ZF equalizer in the 2×2 system is colored violet. The black line of the ML detection at the BS without rejecting the interference reveals the poor performance because of the very low average SNR. The proposed blind decoding makes use of LS solution which minimizes the computational complexity and excels the performance of the conventional ZF linear equalizer.

In the relay wireless communication system, the communication performance can be enhanced by precoding with the three-phase bidirectional relaying scheme applied.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a Base Station (BS) which comprises a plurality of antennas in a relay wireless communication system, the method comprising:
   receiving a relay signal comprising a transmit symbol vector of the BS and a transmit symbol vector of a Mobile Station (MS) from a Relay Station (RS);
   determining power difference values corresponding to all of symbol vectors available as the transmit symbol vector of the MS; and
   determining the transmit symbol vector of the MS or per bit Log Likelihood Ratios (LLRs) using the power difference values,
   wherein the power difference value indicates a difference value between a transmit signal power of the BS extracted from a received signal using an estimation value of the transmit symbol vector of the MS, and a transmit signal power of the BS.

2. The method of claim 1, wherein the relay signal is a sum of the transmit symbol vector of the MS and the transmit symbol vector of the BS which are multiplied by a precoding matrix.

3. The method of claim 1, wherein the determining of the power difference values comprises:
   estimating a channel matrix with the RS;
   determining the transmit signal power of the BS extracted from the received signal using the estimation value of the transmit symbol vector of the MS based on a first equation; and
   determining the power difference values based on a second equation, wherein the first equation is defined by:

$$R_1|\hat{S}_2 = H_{R1}^{-1}(Y_1 - p_2 H_{R1} \hat{S}_2)$$

where $R_1$ denotes a received signal with interference cancelled, $H_{R1}$ denotes a channel matrix between the RS and the BS, $Y_1$ denotes a received signal of the BS, $p_1$ denotes a relay power coefficient for the BS, and $\hat{S}_2$ denotes the estimation value of the transmit symbol vector of the MS, and wherein the second equation is defined by:

$$\gamma_l|_{S_2(:,l)} = (R_1(:,l)|\hat{S}_2) - p_1^2 \|S_1(:,l)\|^2,$$

where $\gamma_l$ denotes a power difference value for an l-th time slot, $R_1(:,l)$ denotes an interference-cancelled received signal vector for the l-th time slot, $p_1$ denotes a relay power coefficient for the BS, and $S_1(:,l)$ denotes the transmit symbol vector of the BS for the l-th time slot.

4. The method of claim 1, wherein the determining of the transmit symbol vector of the MS or the per bit LLRs using the power difference values comprises:
   determining occurrence probabilities of the power difference values respectively.

5. The method of claim 4, wherein the occurrence probabilities of the power difference values are determined based on:

$$P(\gamma_l | S_2(:,l), S_2(:,l)) = \frac{1}{\pi} \sum_{j=1}^{J} \frac{\cos\alpha(t_j, \gamma_l)}{\beta(t_j)} \cdot \frac{T_U}{J}$$

-continued $$\alpha(t, \gamma_l) = \sum_{i=1}^{N} \left[ \frac{f_i}{2} \arctan(2t\lambda_i) + \delta_i^2 t\lambda_i (1 + 4t^2\lambda_i^2)^{-1} \right] - (\gamma_l + N)t$$

$$\beta(t) = \prod_{i=1}^{N} [(1 + 4t^2\lambda_i^2)^{f_i/4}] \exp\left\{ 2t^2 \sum_{j=1}^{N} (\delta_j^2\lambda_j^2)/(1 + 4t^2\lambda_j^2) \right\}$$

$$\delta_j^2 = \sum_{q=1}^{f_j} \eta_{iq}^2$$

$$N = x_l^T B x_l = \|S_1(:,l)\|^2$$

$$x_l = -p_1 \begin{bmatrix} \mathrm{Re}\{(H_{R1}^{-1})^H S_1(:,l)\} \\ \mathrm{Im}\{(H_{R1}^{-1})^H S_1(:,l)\} \end{bmatrix}$$

$$B = \begin{bmatrix} \mathrm{Re}\{H_{R1}^{-1}\} & -\mathrm{Im}\{H_{R1}^{-1}\} \\ \mathrm{Im}\{H_{R1}^{-1}\} & \mathrm{Re}\{H_{R1}^{-1}\} \end{bmatrix}^T \begin{bmatrix} \mathrm{Re}\{H_{R1}^{-1}\} & -\mathrm{Im}\{H_{R1}^{-1}\} \\ \mathrm{Im}\{H_{R1}^{-1}\} & \mathrm{Re}\{H_{R1}^{-1}\} \end{bmatrix}$$

where $\gamma_l$ denotes a power difference value for an l-th time slot, $S_2(:,l)$ denotes a transmit symbol vector of the MS for the l-th time slot, $\hat{S}_2(:,l)$ denotes an estimation value of the transmit symbol vector of the MS for the l-th time slot, $T_{l'}$ denotes an ending point of $t_j$, J denotes the number of indexes $t_j$, $\overline{N}$ denotes a rank of a matrix B; that is, denotes a number of linearly independent row vectors, $\lambda_i$ denotes distinct non-zero eigenvalues of the matrix $$\left( = \frac{N_0}{2} B \right)$$

acquired by dividing a product of the matrix B and a noise power by 2, $f_i$ denotes respective orders of multiplicity of $\lambda_i$; that is, denotes a number of eigenvectors having $\lambda_i$ as the eigenvalue, $\eta_{iq}$ denotes an element of $\Omega^{-1}\mu/\sqrt{N_0/2}$ corresponding to the same $\lambda_i$, $\Omega$ denotes an orthogonal matrix comprising eigenvectors of the matrix B, $\mu$ denotes $-B^{-1}x_l$, $H_{R1}$ denotes a channel matrix between the RS and the BS, $S_1(:,l)$ denotes the transmit symbol vector of the BS for the l-th time slot, and $Z_1(:,l)$ denotes a noise vector of a channel between the RS and the BS for the l-th time slot.

6. The method of claim 4, wherein the determining of the transmit symbol vector of the MS using the power difference values comprises:
determining a symbol vector corresponding a greatest occurrence probability among all of the possible symbol vectors, as the transmit symbol vector of the MS.

7. The method of claim 4, wherein the determining of the per bit LLRs using the power difference values comprises:
determining a first value which is a sum of the occurrence probabilities of the power difference values determined from symbol vectors when a bit value is 1 with respect to each bit;
determining a second value which is a sum of the occurrence probabilities of the power difference values determined from symbol vectors when the bit value is 0; and
determining the per bit LLRs by determining a ratio of the first value and the second value.

8. The method of claim 1, wherein the determining of the transmit symbol vector of the MS using the power difference values comprises:
determining an optimum value of a power difference value which minimizes a cost function indicating a result of subtracting a product of a transmit signal of the BS, a precoding matrix, and a noise vector and a noise power from the power difference value; and
determining a symbol vector corresponding a power difference value most similar to the optimum value among the possible symbol vectors, as the transmit symbol vector of the MS.

9. The method of claim 8, wherein the optimum value is determined based on:

$$\gamma_l^{opt} = N_0^{(1)} tr[H_{R1}^{-1}(H_{R1}^{-1})^H]$$

where $\gamma_l^{opt}$ denotes the optimum value, $N_0^{(1)}$ denotes the noise power, tr[ ] denotes a trace operator, and $H_{R1}$ denotes the channel matrix between the RS and the BS.

10. An apparatus of a Base Station (BS) which comprises a plurality of antennas in a relay wireless communication system, the apparatus comprising:
a plurality of receivers configured to receive a relay signal comprising a transmit symbol vector of the BS and a transmit symbol vector of a Mobile Station (MS) from a Relay Station (RS); and
a detector configured to determine power difference values corresponding to all of symbol vectors available as the transmit symbol vector of the MS, and determine the transmit symbol vector of the MS or per bit Log Likelihood Ratios (LLRs) using the power difference values,
wherein the power difference value is configured to indicate a difference value between a transmit signal power of the BS extracted from a received signal using an estimation value of the transmit symbol vector of the MS, and a transmit signal power of the BS.

11. The apparatus of claim 10, wherein the relay signal is a sum of the transmit symbol vector of the MS and the transmit symbol vector of the BS which are multiplied by a precoding matrix.

12. The apparatus of claim 10, further comprising:
an estimator configured to estimate a channel matrix with the RS,
wherein the detector is configured to determine the transmit signal power of the BS extracted from the received signal using the estimation value of the transmit symbol vector of the MS based on a first equation, and determines the power difference values based on a second equation, wherein the first equation defined by:

$$R_1|_{\hat{S}_2} = H_{R1}^{-1}(Y_1 - p_2 H_{R1} \hat{S}_2),$$

where $R_1$ denotes a received signal with interference cancelled, $H_{R1}$ denotes a channel matrix between the RS and the BS, $Y_1$ denotes a received signal of the BS, $p_1$ denotes a relay power coefficient for the BS, and $\hat{S}_2$ denotes the estimation value of a transmit symbol vector of the MS, and wherein the second equation is defined by:

$$\gamma_l|_{\hat{S}_2(:,l)} = (R_1(:,l)|_{\hat{S}_2})^H (R_1(:,l)|_{\hat{S}_2}) - p_1^2 \|S_1(:,l)\|^2,$$

where $\gamma_l$ denotes a power difference value for an l-th time slot, $R_1(:,l)$ denotes an interference-cancelled received signal vector for the l-th time slot, $p_1$ denotes the relay power coefficient for the BS, and $S_1(:,l)$ denotes the transmit symbol vector of the BS for the l-th time slot.

13. The apparatus of claim 10, wherein the detector determines occurrence probabilities of the power difference values respectively in order to determine the transmit symbol vector of the MS or the per bit LLRs.

14. The apparatus of claim 13, wherein the occurrence probabilities of the power difference values are determined based on:

$$P(\gamma_l \mid S_2(:,l), \hat{S}_2(:,l)) = \frac{1}{\pi}\sum_{j=1}^{J} \frac{\cos\alpha(t_j, \gamma_l)}{\beta(t_j)} \cdot \frac{T_U}{J}$$

$$\alpha(t, \gamma_l) = \sum_{i=1}^{N}\left[\frac{f_i}{2}\arctan(2t\lambda_i) + \delta_i^2 t\lambda_i(1 + 4t^2\lambda_i^2)^{-1}\right] - (\gamma_l + N)t$$

$$\beta(t) = \prod_{i=1}^{N}[(1 + 4t^2\lambda_i^2)^{f_i/4}]\exp\left\{2t^2\sum_{j=1}^{N}(\delta_j^2\lambda_j^2)/(1 + 4t^2\lambda_j^2)\right\}$$

$$\delta_j^2 = \sum_{q=1}^{f_j}\eta_{iq}^2$$

$$N = x_l^T B x_l = \|S_1(:,l)\|^2$$

$$x_l = -p_1\begin{bmatrix}\operatorname{Re}\{(H_{R1}^{-1})^H S_1(:,l)\}\\ \operatorname{Im}\{(H_{R1}^{-1})^H S_1(:,l)\}\end{bmatrix}$$

$$B = \begin{bmatrix}\operatorname{Re}\{H_{R1}^{-1}\} & -\operatorname{Im}\{H_{R1}^{-1}\}\\ \operatorname{Im}\{H_{R1}^{-1}\} & \operatorname{Re}\{H_{R1}^{-1}\}\end{bmatrix}^T \begin{bmatrix}\operatorname{Re}\{H_{R1}^{-1}\} & -\operatorname{Im}\{H_{R1}^{-1}\}\\ \operatorname{Im}\{H_{R1}^{-1}\} & \operatorname{Re}\{H_{R1}^{-1}\}\end{bmatrix}$$

where $\gamma_l$ denotes a power difference value for an l-th time slot, $S_2(:,l)$ denotes the transmit symbol vector of the MS for the l-th time slot, $\hat{S}_2(:,l)$ denotes the estimation value of the transmit symbol vector of the MS for the l-th time slot, $T_U$ denotes an ending point of $t_j$, J denotes the number of indexes $t_j$, $\overline{N}$ denotes a rank of a matrix B; that is, denotes the number of linearly independent row vectors, $\lambda_i$ denotes distinct non-zero eigenvalues of the matrix $$\left(=\frac{N_0}{2}B\right)$$

acquired by dividing a product of the matrix B and a noise power by 2, $f_i$ denotes respective orders of multiplicity of $\lambda_i$;

that is, denotes the number of eigenvectors having $\lambda_i$ as the eigenvalue, $\eta_{iq}$ denotes an element of $\Omega^{-1}\mu/\sqrt{N_0/2}$ corresponding to the same $\lambda_i$, $\Omega$ denotes an orthogonal matrix comprising eigenvectors of the matrix B, $\mu$ denotes $-B^{-1}x_l$, $H_{R1}$ denotes a channel matrix between the RS and the BS, $S_1(:,l)$ denotes the transmit symbol vector of the BS for the l-th time slot, and $Z_1(:,l)$ denotes a noise vector of a channel between the RS and the BS for the l-th time slot.

15. The apparatus of claim 13, wherein the detector is configured to determine a symbol vector corresponding a greatest occurrence probability among all of the possible symbol vectors, as the transmit symbol vector of the MS.

16. The apparatus of claim 13, wherein the detector is configured to determine a first value which is a sum of the occurrence probabilities of the power difference values determined from symbol vectors when a bit value is 1 with respect to each bit, determines a second value which is a sum of the occurrence probabilities of the power difference values determined from symbol vectors when the bit value is 0, and determines the per bit LLRs by determining a ratio of the first value and the second value.

17. The apparatus of claim 10, wherein the detector is configured to determine an optimum value of a power difference value which minimizes a cost function indicating a result of subtracting a product of a transmit signal of the BS, a precoding matrix, and a noise vector and a noise power from the power difference value, and determines a symbol vector corresponding a power difference value most similar to the optimum value among the possible symbol vectors, as the transmit symbol vector of the MS.

18. The apparatus of claim 17, wherein the optimum value is determined based on:

$$\gamma_l^{opt} = N_0^{(1)} tr[_{R1}^{-1}(H_{R1}^{-1})^H]$$

where $\gamma_l^{opt}$ denotes the optimum value, $N_0^{(1)}$ denotes the noise power, tr[ ] denotes a trace operator, and $H_{R1}$ denotes the channel matrix between the RS and the BS.

* * * * *